United States Patent
Caspi et al.

(10) Patent No.: US 7,403,786 B2
(45) Date of Patent: Jul. 22, 2008

(54) SYSTEM AND METHOD FOR IN-BUILDING PRESENCE SYSTEM

(75) Inventors: Rami Caspi, Sunnyvale, CA (US); William J. Beyda, Cupertino, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 246 days.

(21) Appl. No.: 10/672,337

(22) Filed: Sep. 26, 2003

(65) Prior Publication Data

US 2005/0070308 A1    Mar. 31, 2005

(51) Int. Cl.
*H04Q 7/20* (2006.01)
(52) U.S. Cl. ............... 455/456.3; 455/456.1; 455/456.2
(58) Field of Classification Search ............... 455/456.1, 455/456.3, 466, 456.2, 457; 342/357.09; 340/573.1; 370/329
See application file for complete search history.

(56) References Cited

U.S. PATENT DOCUMENTS

| | | | |
|---|---|---|---|
| 6,091,956 A | 7/2000 | Hollenberg | |
| 6,144,336 A * | 11/2000 | Preston et al. | 342/357.09 |
| 6,167,277 A | 12/2000 | Kawamoto | |
| 6,349,206 B1 | 2/2002 | Reichelt | |
| 6,405,106 B1 | 6/2002 | Sheth et al. | |
| 6,456,852 B2 | 9/2002 | Bar et al. | |
| 6,484,033 B2 * | 11/2002 | Murray | 455/456.3 |
| 6,498,565 B2 | 12/2002 | Boulay et al. | |
| 6,515,595 B1 | 2/2003 | Obradovich et al. | |
| 6,542,818 B1 | 4/2003 | Oesterling | |
| 6,553,232 B1 | 4/2003 | Shaffer et al. | |
| 6,556,819 B2 | 4/2003 | Irvin | |
| 6,564,127 B1 | 5/2003 | Bauerle et al. | |
| 6,757,722 B2 | 6/2004 | Lönnfors et al. | |
| 6,760,759 B1 | 7/2004 | Chan | |
| 6,763,302 B2 | 7/2004 | Mori | |
| 6,810,323 B1 | 10/2004 | Bullock et al. | |
| 6,868,074 B1 | 3/2005 | Hanson | |
| 6,879,838 B2 | 4/2005 | Rankin et al. | |
| 6,892,131 B2 | 5/2005 | Coffee et al. | |
| 6,910,135 B1 | 6/2005 | Grainger | |
| 6,968,179 B1 | 11/2005 | De Vries | |
| 6,969,179 B2 | 11/2005 | Sloan et al. | |
| 6,970,547 B2 | 11/2005 | Andrews et al. | |
| 6,985,742 B1 | 1/2006 | Giniger et al. | |
| 7,034,690 B2 | 4/2006 | Chaco | |
| 2001/0046215 A1 * | 11/2001 | Kim | 370/329 |
| 2001/0048364 A1 * | 12/2001 | Kalthoff et al. | 340/573.1 |
| 2001/0052849 A1 | 12/2001 | Jones, Jr. | |
| 2002/0116336 A1 | 8/2002 | Diacakis et al. | |
| 2002/0126701 A1 | 9/2002 | Requena | |

(Continued)

FOREIGN PATENT DOCUMENTS

CA    2 291 553 A1    5/2000

*Primary Examiner*—Duc Nguyen
*Assistant Examiner*—Wayne Cai

(57) ABSTRACT

A telecommunications system includes a plurality of network clients (150) including a positioning controller (504) and a communications controller (502); and a positioning server (152) including a coordinating controller (161) for maintaining a database of network clients to be tracked and provide updates of position-related information to a presence server (104). The plurality of network clients (150) are configured to transmit position information received via the positioning controller (504) to the positioning server via the communications controller (502), the positioning information including information related to loss of a position signal.

21 Claims, 27 Drawing Sheets

U.S. PATENT DOCUMENTS

| | | |
|---|---|---|
| 2003/0004743 A1 | 1/2003 | Callegari |
| 2003/0018704 A1 | 1/2003 | Polychronidis et al. |
| 2003/0060211 A1 | 3/2003 | Chern et al. |
| 2003/0074443 A1 | 4/2003 | Melaku et al. |
| 2003/0092451 A1 * | 5/2003 | Holloway et al. ........... 455/461 |
| 2003/0096622 A1 | 5/2003 | Moilanen |
| 2003/0104819 A1 | 6/2003 | Knauerhase et al. |
| 2003/0112948 A1 | 6/2003 | Brown et al. |
| 2003/0154293 A1 | 8/2003 | Zmolek |
| 2004/0005886 A1 | 1/2004 | Oda et al. |
| 2004/0059781 A1 | 3/2004 | Yoakum et al. |
| 2004/0062383 A1 | 4/2004 | Sylvain |
| 2004/0122901 A1 | 6/2004 | Sylvain |
| 2004/0125941 A1 | 7/2004 | Yoakum et al. |
| 2004/0152454 A1 | 8/2004 | Kauppinen |
| 2004/0185838 A1 | 9/2004 | Seligmann |
| 2004/0266398 A1 | 12/2004 | Adamczyk et al. |

* cited by examiner

Location ⟋ 3900

Exact Address 1 (Office)
    Exact Address 2 (Home)
    On Campus
    Within City (Outside Radius 1)
    Outside City (Outside Radius 2)
    Within City: Traveling Callers ⟋ 3904

All Callers
    Work Group
    Individual Callers

Availability ⟋ 3902

Office Phone
    E-mail
    Instant Messaging
    PDA Wireless
    Cell Phone
    PCS Cell Phone
    S49 Cell Phone
    GSM Cell Phone
    Voice Mail Presence Status ⟋ 3906

A + Lunch
    A + Desk
    Online
    On Vacation
    In Car

FIG. 3A

SYSTEM AND METHOD FOR IN-BUILDING PRESENCE SYSTEM

CROSS REFERENCE TO RELATED APPLICATIONS

This application is related to commonly-assigned, application Ser. No. 10/672,456, titled, SYSTEM AND METHOD FOR WEB-BASED PRESENCE PERIMETER RULE MONITORING; application Ser. No. 10/672,105, titled, SYSTEM AND METHOD FOR PRESENCE ALARMING; application Ser. No. 10/672,621, titled, SYSTEM AND METHOD FOR SPEED-BASED PRESENCE STATE MODIFICATION; application Ser. No. 10/672,902, titled, SYSTEM AND METHOD FOR FAILSAFE PRESENCE MONITORING; application Ser. No. 10/672,439, titled, SYSTEM AND METHOD FOR PRESENCE-BASED AREA MONITORING; application Ser. No. 10/672,641, titled, SYSTEM AND METhOD FOR GLOBAL POSITIONING SYSTEM (GPS) BASED PRESENCE; application Ser. No. 10/672,899, titled, SYSTEM AND METHOD FOR GLOBAL POSITIONING SYSTEM ENHANCED PRESENCE RULES; application Ser. No. 10/672,367, titled, SYSTEM AND METHOD FOR ALTERNATIVE PRESENCE REPORTING SYSTEM; application Ser. No. 10/672,057, titled, SYSTEM AND METHOD FOR CENTRALLY-HOSTED PRESENCE REPORTING; and application Ser. No. 10/672,364, titled, SYSTEM AND METHOD FOR PRESENCE PERIMETER RULE DOWNLOADING, all filed concurrently on Sep. 26, 2003.

FIELD OF THE INVENTION

The present invention relates to telecommunications systems and, in particular, to an improved system and method for providing and maintaining presence information.

BACKGROUND OF THE INVENTION

Presence systems, such as Instant Messaging systems, provide relatively basic information to network clients concerning the presence status of related users, such as those on the network clients' buddy lists. In typical operation, a presence status of each user is determined and that information is distributed to those who are watching the corresponding user.

Even in Internet Protocol (IP) telephone networks, presence status is typically determined using relatively basic presence indications. These include, for example, detection of whether the user is logged on, detection of keyboard activity, detection of whether a desk phone is in use or in a do-not-disturb mode, detection of Instant Messaging activity, or detection of a manual presence setting. Consequently, errors or inaccuracies in presence reporting are relatively common.

For example, suppose a user left the office for lunch and has manually changed his presence status to reflect this. He then returns, but forgets to change the status and then leaves on a business trip. People who check his status will be informed that he is still unavailable, i.e., out to lunch, when it may in fact be possible to reach him at an alternative location, such as a cell phone.

As such, there is a need for an improved system and method for accurately reporting a user's presence status. There is a further need for a system and method for tracking a user in a presence system.

SUMMARY OF THE INVENTION

These and other drawbacks in the prior art are overcome in large part by a system and method according to embodiments of the present invention.

A telecommunications system according to an embodiment of the present invention includes a plurality of network clients including a positioning controller and a communications controller; and a positioning server including a coordinating controller for maintaining a database of network clients to be tracked and provide updates of position-related information to a presence server. The plurality of network clients are configured to transmit position information received via the positioning controller to the positioning server via the communications controller, the positioning information including information related to loss of a position signal.

A telecommunications device according to an embodiment of the present invention includes a positioning controller adapted to determine positioning information for the telecommunications device; a cellular telephone controller adapted to receive the positioning information from said positioning controller and cause the positioning information to be transmitted to an associated server; and a database controller for maintaining a database of position-presence correlation rules defining when the positioning information is to be transmitted.

A telecommunications method according to an embodiment of the present invention includes receiving one or more user positioning and presence correlation rules at a server, wherein positioning information is received from remote users having positioning controllers for receiving location information and communication controllers for transmitting the location information to the server via a wireless communication network; and transmitting the one or more positioning and presence correlation rules to at least one of the remote users; wherein the one or more positioning and presence correlation rules include loss of a positioning signal.

A better understanding of these and other specific embodiments of the invention is obtained when the following detailed description is considered in conjunction with the following drawings.

BRIEF DESCRIPTION OF THE DRAWINGS

FIG. 3A-FIG. 3D illustrate exemplary rules setting and mapping graphical user interfaces according to an embodiment of the present invention;

DETAILED DESCRIPTION OF EMBODIMENTS OF THE INVENTION

System Overview and User Interface

Figure 1:
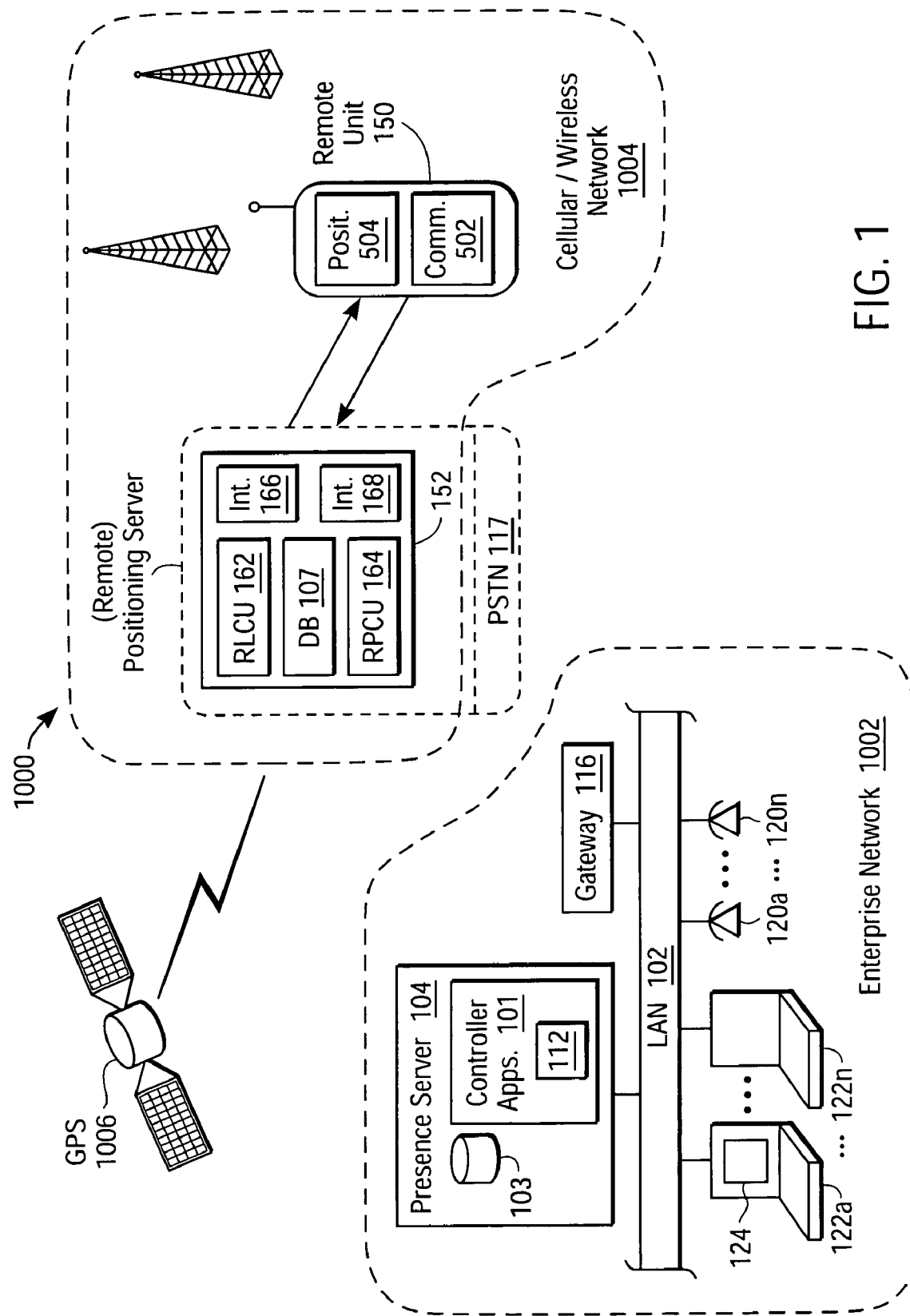
FIG. 1 illustrates a telecommunication system according to an embodiment of the present invention.

Turning now to the drawings and, with particular attention to FIG. 1, a diagram of an exemplary telecommunications system 1000 according to an embodiment of the present invention is shown. As shown, the telecommunications system 1000 includes an enterprise network 1002, a wireless communication network 1004, and may also include a global positioning network 1006.

The wireless communication network 1004 may be implemented as any of a variety of wireless telecommunications networks, such as a personal communication service (PCS) or cellular-type network, including dial-up cellular, or data cellular networks such as CDPD networks, SMS networks, WiFi networks, and the like. In other embodiments, the wireless communications network 1004 may be implemented as one or more two-way radio networks. The wireless communication network 1104 includes one or more network clients implemented as wireless devices 150, also referred to as remote devices. The wireless devices 150 may include positioning controllers 504 and communication controllers 502. As will be explained in greater detail below, the positioning controller 504 is configured to determine a position or location of the wireless device 150, such as by receiving global positioning network signals from one or more global positioning satellites 1006. It is noted, however, that any mechanism to locate the device within the desired degree of precision may be employed. As will be explained in greater detail below, the remote device 150 operates to receive location information from the positioning system and transmit location and/or presence updates to one or more users or servers using the communication controllers. The remote device 150 may likewise receive presence and/or program updates from the servers. In certain embodiments, the communication controllers 502 are cellular telephone controllers.

In certain embodiments of the present invention, the wireless network 1004 includes one or more positioning or remote servers 152. As will be explained in greater detail below, the remote server 152 may include a coordinating controller including a remote location control unit (RLCU) 162 and a remote presence control unit (RPCU) 164. The remote location control unit 162 may interact with an interface 166 to receive location signals from the remote users 150 and transmit updates, typically received from the enterprise network 1002, to the remote users 150. In certain embodiments, the interface 166 is implemented as a telephone dial-up interface. The remote presence control unit 164 may interact with an interface 168 for transmitting and receiving presence and/or location related updates to the enterprise server 104. Presence and/or location rules, such as user identification and correlation pairs, may be stored in database 107.

As noted above, in the embodiment illustrated, the telecommunications system 1000 of FIG. 1 includes an enterprise network 1002. As shown, the enterprise network 1002 includes a local area network (LAN) 102. The LAN 102 may be implemented using a TCP/IP network and may implement voice or multimedia over IP using, for example, the Session Initiation Protocol (SIP) or ITU Recommendation H.323. Coupled to the local area network 102 is an enterprise or presence server 104, which may be embodied as a multimedia server including a presence server or service.

The server 104 may include one or more controllers 101, which may be embodied as one or more microprocessors, and memory 103 for storing application programs and data. As will be explained in greater detail below, the server 104 may provide a variety of services to various associated client devices, including telephones, personal digital assistants, text messaging units, and the like. Further, according to embodiments of the present invention, the controllers 101 may implement an interactive suite of applications 112, including enterprise presence control units and enterprise location control units, as will be explained in greater detail below.

Also coupled to the LAN 102 is a gateway 116 which may be implemented as a gateway to a private branch exchange (PBX), the public switched telephone network (PSTN) 117, or any of a variety of other networks, such as a wireless, PCS, or cellular network. In addition, one or more local controllers such as LAN or IP telephones 120a-120n and one or more computers 122a-122n may be operably coupled to the LAN

102. A plurality of cellular telephone units 150 may also couple to the network, via gateway 116.

The computers 122a-122n may be personal computers implementing the Windows XP operating system and thus, running Windows Messenger client. In addition, the computers 122a-122n may include telephony and other multimedia messaging capabilities using, for example, peripheral cameras, microphones and speakers (not shown) or peripheral telephony handsets. In other embodiments, one or more of the computers may be implemented as wireless telephones, digital telephones, or personal digital assistants (PDAs). Thus, the figures are exemplary only. The computers may include one or more Pentium-type microprocessors, and storage for applications and other programs. The computers may further implement network interface devices 124 for presence control and network interaction and receiving signals for transmission over the network to the server 104.

In operation, a user may use one of the computers 122 to upload a set of one or more location-presence correlation rules to the enterprise presence server 104. The enterprise presence server 104 then maintains a database in memory 103 of presence users and their location rules. This information can then be provided when users' watch lists are updated, as will be explained in greater detail below. In turn, the enterprise server 104 can upload the rules to the remote location server 152. These, in turn, can be transmitted to the appropriate remote device 150, for example, via a dial-up operation. When the remote device 150 then receives location information from the GPS system 1006, it can contact the remote server 152 and transmit the corresponding location and/or presence information. The remote server 152 will then distribute the information to the appropriate local server 104, which will update the presence databases and watch lists for the various users.

Figure 2:
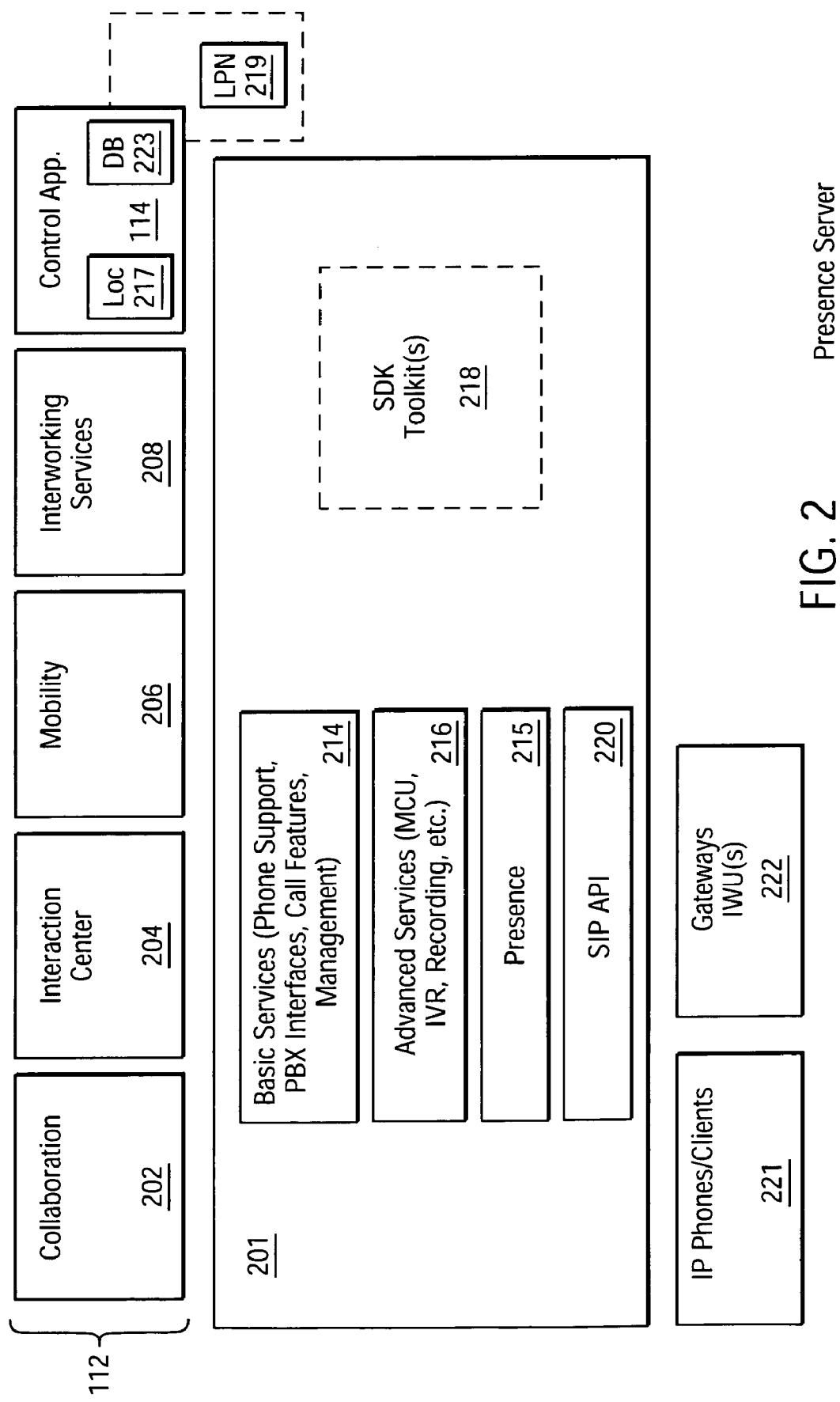
FIG. 2 is a diagram illustrating an exemplary enterprise telecommunications server according to an embodiment of the present invention.

Turning now to FIG. 2, a functional model diagram illustrating a server 104 including a control unit 114 is shown. More particularly, FIG. 2 is a logical diagram illustrating a particular embodiment of a server 104. The server 104 includes a plurality of application modules 112 and a communication broker module 201. In addition, the server 104 provides interfaces, such as SIP APIs (application programming interfaces) 220 to SIP IP phones 221 and gateways/interworking units 222.

According to the embodiment illustrated, the broker module 201 includes a basic services module 214, presence module 215, an advanced services module 216, and a toolkit module 218.

The basic services module 214 functions to implement, for example, phone support, PBX interfaces, call features and management, as well as Windows Messaging and RTC add-ins, when necessary. The phone support features allow maintenance of and access to buddy lists and provide presence status.

It is noted that the above are MS Windows related terminology, but this invention can work in any type of IP based network, such as IBM SameTime, SUN One and the like.

The advanced services module 216 implements functions such as multipoint control unit (MCU), recording, Interactive Voice Response (IVR), and the like. MCU functions are used for voice conferencing and support ad hoc and dynamic conference creation from a buddy list following the SIP conferencing model for ad hoc conferences. In certain embodiments, support for G.711 and G.723.1 codecs is provided. Further, in certain embodiments, the MCU can distribute media processing over multiple MC's (Multimedia Processors) servers using the MEGACO protocol.

Presence features 215 provide device context for both SIP registered devices and user-defined non-SIP devices. Various user contexts, such as In Meeting, On Vacation, In the Office, etc., can be provided for. In addition, voice, e-mail and instant messaging availability may be provided across the user's devices. The presence feature 215 enables real time call control using presence information, e.g., to choose a destination based on the presence of a user's devices. In addition, various components have a central repository for presence information and for changing and querying presence information. In addition, the presence module 215 provides a user interface for presenting the user with presence information.

The broker module 201 may include an interactive voice response (IVR) such as the ComResponse platform, available from Siemens Information and Communication Networks, Inc. ComResponse features include speech recognition, speech-to-text, and text-to-speech, and allow for creation of scripts for applications.

In addition, real time call control is provided by a SIP API 220 associated with the basic services module 214. That is, calls can be intercepted in progress and real time actions performed on them, including directing those calls to alternate destinations based on rules and or other stimuli. The SIP API 220 also provides call progress monitoring capabilities and for reporting status of such calls to interested applications. The SIP API 220 also provides for call control from the user interface.

According to the embodiment illustrated, the application modules 112 include a collaboration module 202, an interaction center module 204, a mobility module 206, an interworking services module 208, and a presence-location control module 114.

The collaboration module 202 allows for creation, modification or deletion of a collaboration session for a group of users. The collaboration module 202 may further allow for invoking a voice conference from any client. In addition, the collaboration module 202 can launch a multi-media conferencing package, such as the WebEx package. It is noted that the multi-media conferencing can be handled by other products.

The interaction center 204 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

The mobility module 206 provides for message forwarding and "one number" access across media, and message "morphing" across media for the subscriber. Further, various applications can send notification messages to a variety of destinations, such as e-mails, instant messages, pagers, and the like. In addition, the subscriber can set rules that the mobility module 206 uses to define media handling, such as e-mail, voice and instant messaging handling. Such rules specify data and associated actions. For example, a rule could be defined to say "If I'm traveling, and I get a voicemail or e-mail marked Urgent, then page me."

The presence-location control module 114 may include database controller 223, a location control unit 217 and a location-presence control unit 219. As will be described in greater detail below, the database controller 223 operates to supervise network users, their location-presence rules, and their watch lists. The location control unit 217 may operate to receive location information from the remote server 152 or directly from users 150. The location-presence control unit 219 operates in conjunction with the presence unit 215 and the database controller 116 to receive and maintain the presence and/or location rules for the corresponding users.

As noted above, the computers 122 may include interfaces 124 for inputting inbound and outbound location-presence rules and presence information. Such rules define both the user's availability (presence) and a specific location associated with the availability. The user can also specify callers who are allowed particularized access to the user. FIG. 3A-3D illustrate exemplary interfaces that may be used to set location and presence rules. It is noted that the specific rules and locations described are exemplary only.

As shown in FIG. 3A, in the embodiment illustrated, the user can set location 3900, availability 3902, callers 3904, and status 3906. It is noted that while particular examples are shown, other locations, availability, callers, and status may be specified. In addition, in certain embodiments, day of week and time of day parameters may also be specified. Thus, the figures are exemplary only.

As shown, example locations 3900 include Exact Address 1 (Office); Exact Address 2 (Home); On Campus; Within City (Radius 1); Outside City (Radius 2); and Within City (Traveling). "Exact addresses" allow the user to specify the exact address of a building or location and set a rule if the user is within a predetermined distance of the location. "On campus" allows the user to specify a rule if the user is on, e.g., the corporate campus. "Within city or outside radius 1" allows the user to specify a rule for when he is outside the campus or a specified building, but within a home city. "Outside city or outside radius 2" allows the user to set a rule for when he is outside the home city or a particular radius. "Within City (Traveling" allows a user to specify that he is within the radius, but may have limited availability.

Example availability 3902 includes Office Phone, E-mail, Instant Messaging, PDA wireless, Cell Phone, PCS cell phone, S49 cell phone, GSM S49 cell phone, and voicemail. The user's availability thus defines the medium to which the call is forwarded or otherwise handled. As can be appreciated, the availability can depend on the user's location. Further, the user may be available via more than one medium concurrently.

Exemplary caller lists 3904 include All Callers; Work Group; or Individual Callers. Using "All Callers," the user can specify rules that will be binding on everyone who calls. "Work Group" is representative of one or more specified lists of users; for example, Family could be another group. "Individual Callers" allow the user to specify a rule to apply on an individual basis to particular callers.

Finally, exemplary presence status 3906 includes At Lunch, At desk, Online, On vacation, In Car, and the like. The status can be set to be automatically updated when a user is at a particular location, or the user can manually set it, as will be explained in greater detail below.

Exemplary rules that can be set include:

1. "While I am in the office <exact address> I am available on my <office phone>, <e-mail>, and <Instant Messaging>.

2. While I am outside of my office <exact location>, but still <on campus>, I am available on my <PDA wireless> and on my <cell phone>.

3. While I am <one mile> away from <exact address> but still <within city> I am available on the <PCS phone>.

4. While I am more that <50 miles> away from <exact address> I am available on my <Siemens S49 cell phone>.

5. While I am in <Munich> then if the call is from <John> then dial my <GSM S49 phone>, otherwise forward call to my <voicemail>.

In addition to user location, presence status rules may be based on the ability of GPS systems to track user speed. For example, in certain embodiments, the system can detect that the user is traveling at a predetermined speed and then update his presence status and availability to indicate, for example, that his status is "In Car" and that his availability is "car phone", "cell phone," "not available," or the like.

For example, as shown in FIG. 3A, the user can set location and the user can additionally set presence status 3906 to indicate "In Car" when the system detects he is traveling above a certain speed, such as 15 miles per hour, for example. The corresponding location 3900 could indicate that the user is "In City" and "Traveling," if it is not desired to give a precise street location. Thus, an exemplary presence rule could be 6. If I am traveling in a speed greater than <15> mph, then I am in my car—set the presence status to "In my car" and I am then available at <cell phone>.

Figure 3B:
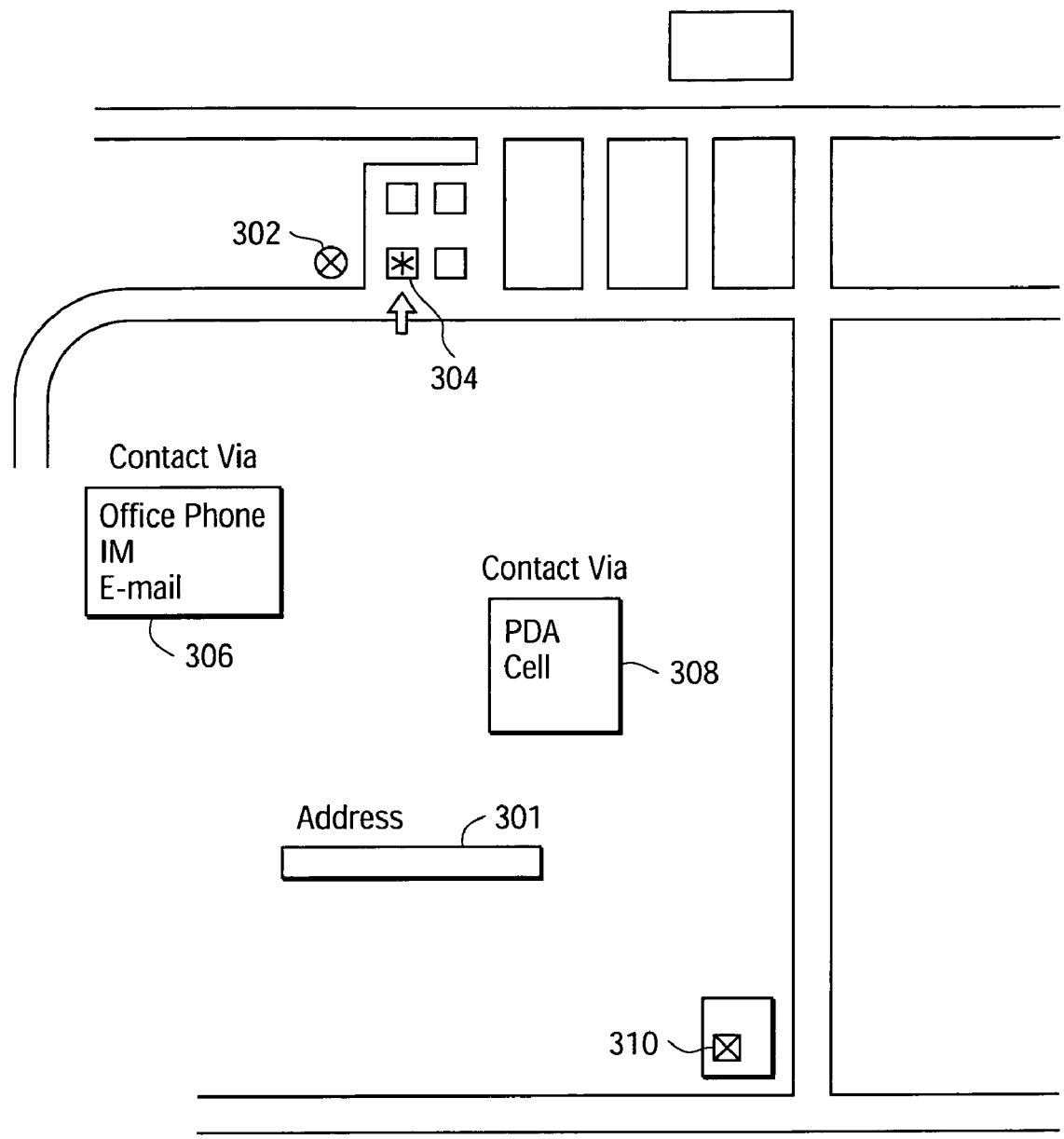
Figure 3C:
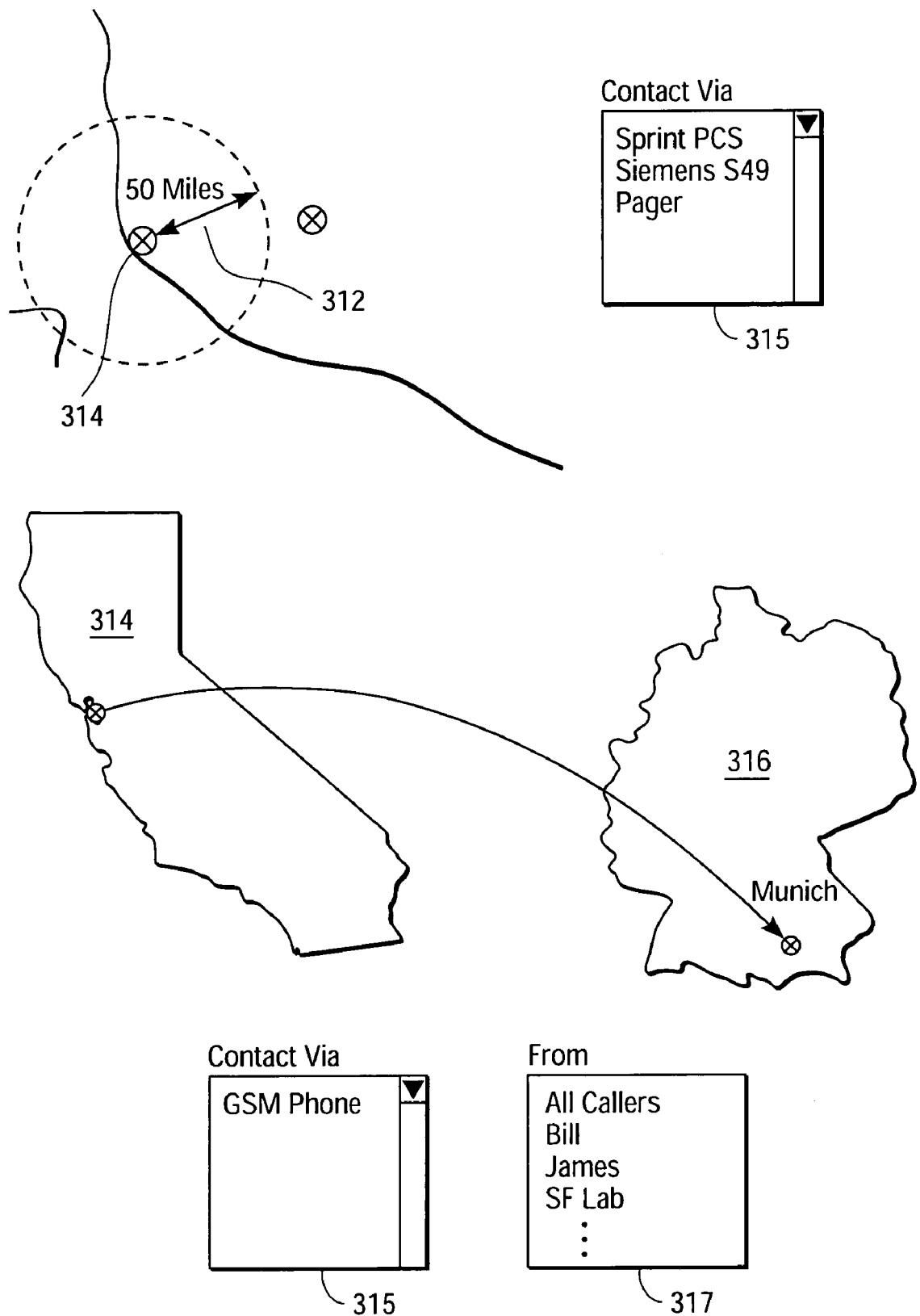
Figure 3D:
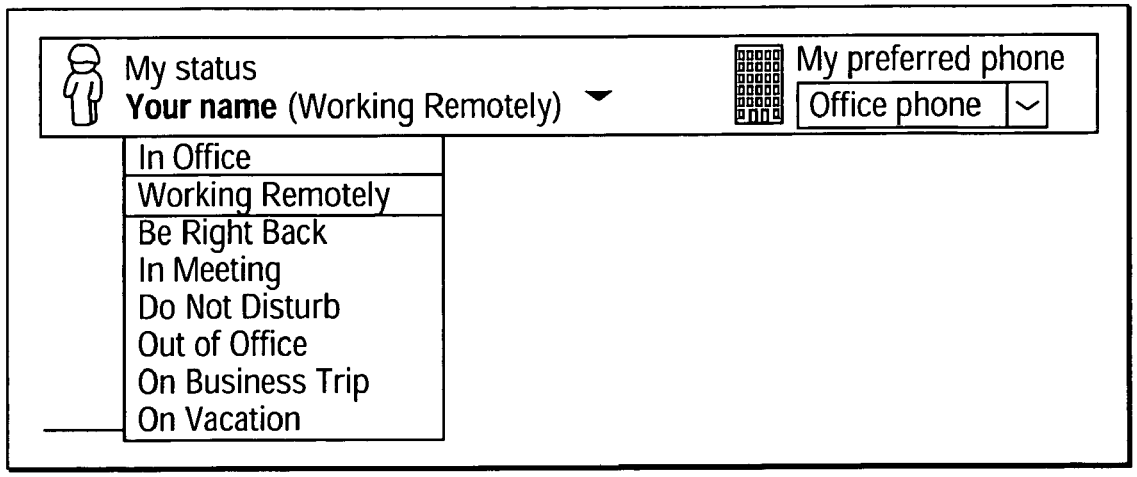

FIG. 3B-FIG. 3D illustrate exemplary user interfaces for setting the rules. Briefly, such graphical user interfaces include a mapping engine, such as Microsoft MapPoint™, and one or more drop down or sub-menus for designating presence and location definitions.

For example, as shown in FIG. 3B, a user can type in an address 301, which will then cause a map to be generated with the location 304 highlighted. As can be appreciated, the map of the interface of FIG. 3B may represent an office campus, with the location 304 representative of the user's office building. The user can then select one of the drop down menus 306, 308 to set the contact information. For example, menu 306 may be used to set Office Phone, IM, or E-mail, typically associated with the user's office. Similarly, if outside the address, e.g., at location 302, or in another building, e.g., location 310, the user can also select contact information. Similar drop-down menus can be used to set user speed, etc.

As shown in FIG. 3C, the user may also select a map location 311 and a radius or other boundary 312 around it. The user can then select a mode of contact within or outside the perimeter. For example, the user may travel from California 314 to Germany 316. Using menus 315, 317, the user can set the contact type as well as the specific callers who are authorized to reach him in Germany.

In addition to setting location rules, the user can set associated status rules, as shown in FIG. 3D. For example, the user can designate whether he is In Office, Working Remotely, etc., and set corresponding contact information.

Figure 4:
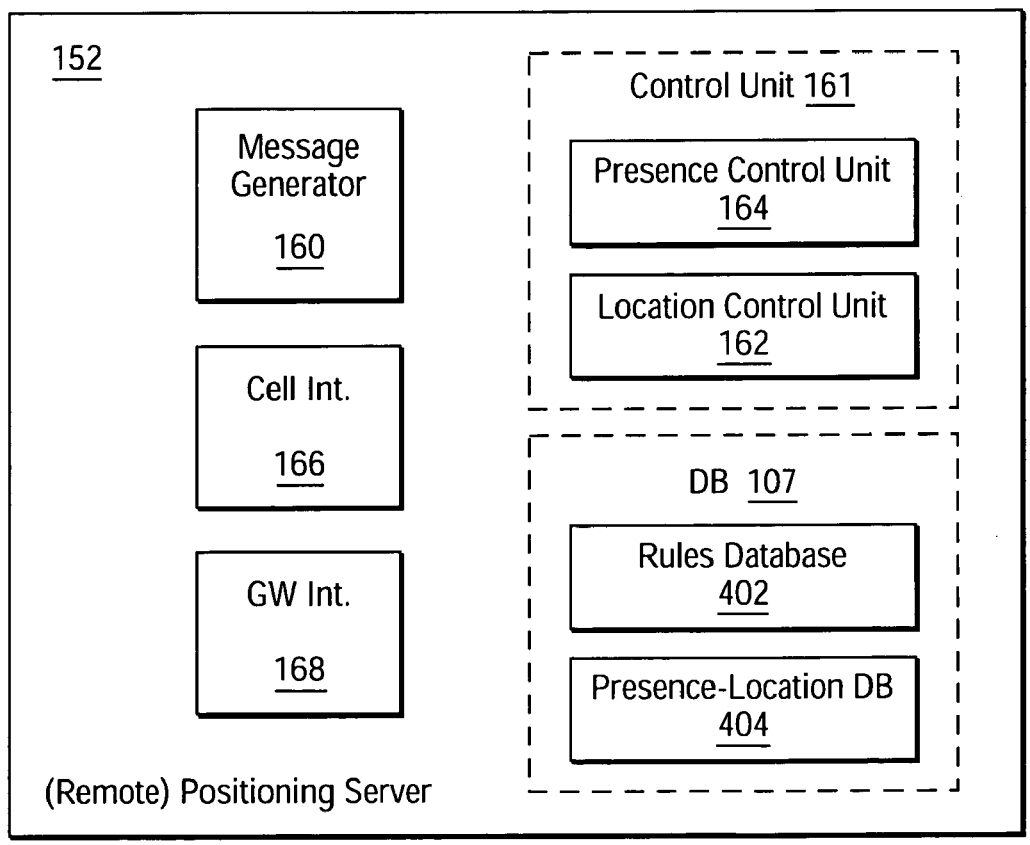
FIG. 4 is a diagram illustrating an exemplary remote telecommunications server according to an embodiment of the present invention.

Turning now to FIG. 4, a block diagram illustrating an exemplary remote or positioning server 152 according to an embodiment of the present invention is shown. As shown, the remote server 152 includes a control unit 161, which may include a remote location control unit 162 and a remote presence control unit 164; a message generator 160; a database 107 that may include a rules database 402 and a presence-location database 404; a wireless interface 168; and a network interface 166.

In certain embodiments, the rules database 402 stores location-presence rule pairs for registered users and is accessible by the presence control unit 164 and location control unit 162. Similarly, in certain embodiments, the presence-location database 404 receives the actual location information and correlates it with the appropriate rules in the rules database 402. In other embodiments, the remote location server 152 maintains a database only of remote users and their associated enterprises. The location and/or presence information received from the remote users is then transmitted to the enterprise server 104.

The wireless interface 166 allows the server 152 to communicate over the wireless network 1004 (FIG. 1) to the remote devices 150. For example, the remote positioning server 152 can transmit rules updates or other information, such as macros, to the remote devices, and can receive presence updates and other information from them. In certain embodiments, the wireless interface 166 is a dial-up cellular telephone or PCS interface. For example, the wireless interface 166 may be implemented as a toll-free dial in for all remote units associated with a particular enterprise.

The message generator 160 and network interface 168 allow communication with the enterprise server 104. More particularly, the message generator 160 may be embodied as an e-mail message generator for formatting presence and/or location information into an e-mail for transmission to designated enterprise users. Similarly, the message generator 160 can be used to unformat or read received messages. In other embodiments, the message generator may implement text messaging, such as Instant Messaging or SMS messaging.

In operation, as will be explained in greater detail below, the remote positioning server 152 can receive messages from the enterprise presence server 104 via the network interface 168 and in a format readable by the message generator 160. These messages can include rules and presence updates from enterprise users 122. Presence updates can be stored by the presence control unit 164 in presence-location database 404. Rules updates can be stored by the presence control unit 164 in the rules database 402. Presence and/or rules updates can then be transmitted by the presence control unit 164 to remote users 150 using the wireless interface 166.

Similarly, location updates from remote users 150 can be received by the location control unit 162 via the wireless interface 166. The location control unit 162 can then store the new location information in the presence-location database 404. The presence control unit 164 can then transmit the new location and/or presence information to the enterprise server 104 using the message generator 160, as discussed above.

It is noted that, in certain embodiments, the enterprise server and the remote server may be the same unit and provided with dial in capability from the remote devices. Thus, the figures are exemplary only.

Figure 5:
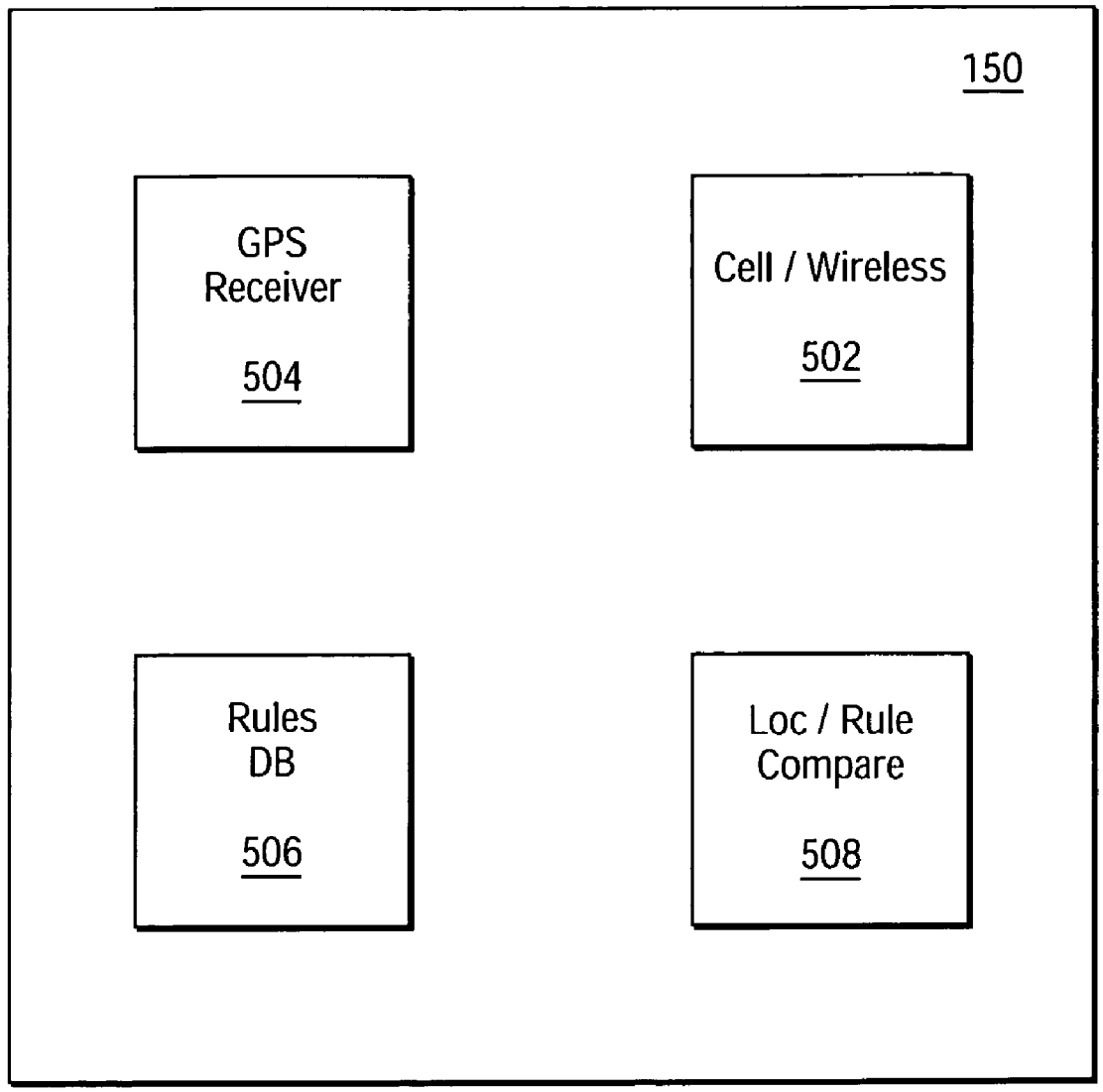
FIG. 5 is a block diagram illustrating an exemplary wireless telecommunications device according to an embodiment of the present invention.

Turning now to FIG. 5, a block diagram of an exemplary telecommunications device 150 according to an embodiment of the present invention is shown. As noted, above, the device 150 may be compatible with any of a variety of PCS or cellular-type networks, including, for example, GSM, and 2G, 2.5G, and 3G cellular telephone systems. In the embodiment illustrated, the remote unit 150 includes a wireless controller 502, such as a cell phone or radio data network controller, and a GPS receiver 504, for receiving location or positioning signals. In addition, the remote unit 150 may maintain a rule database 506 of location-presence rules, and a rules compare controller 508 for comparing current conditions to those specified in the rules. As will be explained in greater detail below, the remote device 150 can send the location server 152 an update of location or presence information. The remote device 150 can likewise receive software and rules updates from the enterprise and/or presence severs.

Figure 6:
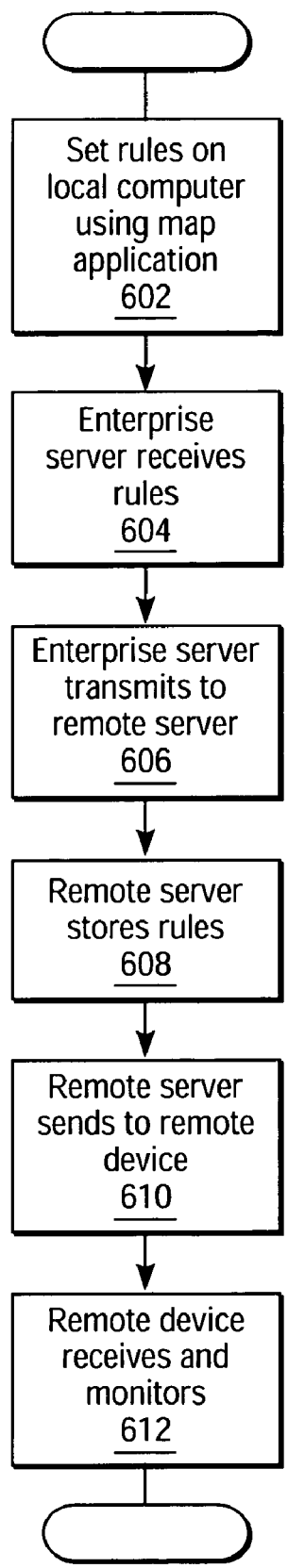
FIG. 6 is a flowchart illustrating operation of an embodiment of the present invention.

Turning now to FIG. 6, a flowchart illustrating operation of an embodiment of the present invention is shown. In particular, the flowchart of FIG. 6 illustrates setting one or more location-presence rules. Initially, at step 602, the user can set one or more location-presence rules using his enterprise computer 122 and mapping interface 124. At step 604, the user can transmit the rules from his enterprise computer 122 to the enterprise presence server 104. The enterprise server 104's location-presence control unit 219 may then store the rules in the database 116. If the enterprise-presence server 104 does not actively maintain the tracking, the enterprise-presence server 104 will transmit the rules to the remote location server 152, at step 606. For example, the remote location server 152 may maintain a dedicated dial up or Internet connection for receiving the rules from enterprise users via interface 168 (FIG. 4). At step 608, the remote location server 152's control unit 161 stores the rules in its presence-location database 404. Depending on how network and device positioning functionality is configured, the remote location server 152 may then transmit the rules to the user remote device 150 at step 610. For example, the remote location server 152 may dial up the remote device's telephone number; when the call is answered, the information can be uploaded. The user remote device 150 may be at least partially responsible for resolving location and presence correlations and determining when updates to status need to be made. Alternatively, the remote location server 152 could be solely responsible and thus need not transmit the rules to the remote user device 150, though a signal indicating the user device 150 should begin location monitoring may be sent. In either case, at step 612, the remote user device 150 will monitor the device location.

Figure 7A:
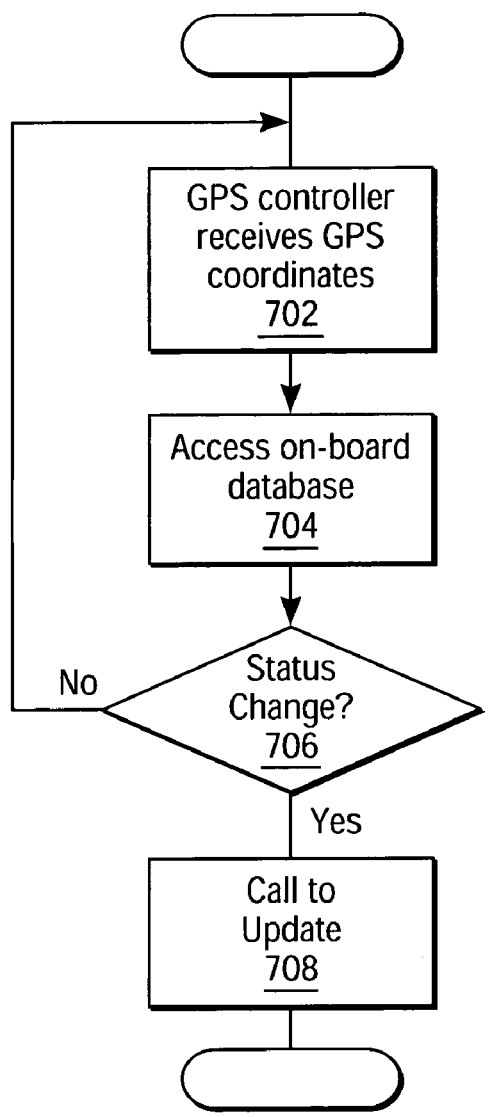
FIGS. 7A-7C are flowcharts illustrating operation of embodiments of the present invention.

Turning now to FIG. 7A, a flowchart illustrating device monitoring of device position according to an embodiment of the present invention is shown. At a step 702, the remote device 150 receives position information via its position receiver 504 (FIG. 5). As noted, above, the position receiver 504 may be adapted to receive one or more position signals from a global positioning network 1006 (FIG. 1). At step 704, the remote user device 150 uses its location compare unit 508 to access the rules database 506. At step 706, the location compare unit 508 determines if there has been a location or presence change. If so, then at step 708, the wireless control unit 502 sets up a call to the appropriate server 152, 104 to advise of the new condition. It is noted that in other embodiments, the remote unit 150 can simply forward any received location or position information to the server as soon as it is received, without performing analysis or compares on the received information.

Figures 7B, 7C:
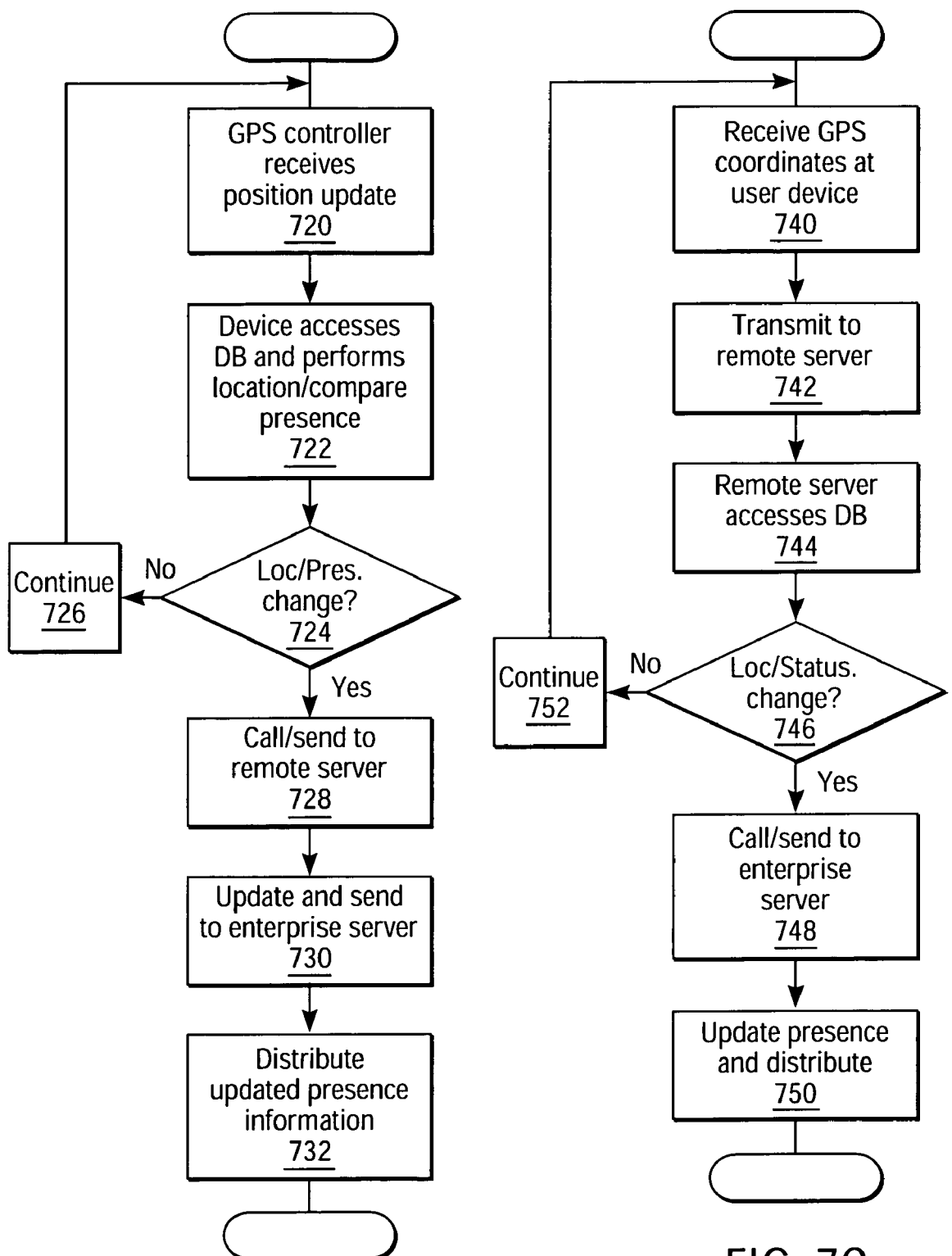

FIG. 7B illustrates more particularly location monitoring and updating according to an embodiment of the present invention. In particular, FIG. 7B illustrates the remote device 150 performing location-rules compares according to embodiments of the present invention. At a step 720, the remote device 150 receives position information via its position receiver 504. As noted above, the position receiver 504 may be adapted to receive one or more position signals from a global positioning network, such as the GPS network 1006. At step 722, the remote device 150 uses its location rule compare unit 508 to access the rules database 506 and perform a location compare, to determine if there has been a location and/or presence change. If there has been no change, as determined at step 724, then monitoring continues, at step 726. Otherwise, at step 728, the wireless controller 502 transmits the updates to the remote location server 152. For example, the remote unit 152 could dial a toll-free number at the server 152. The update information can be location update or presence status update, or both. The remote location server 152 updates the device's position and/or presence information in its presence-location database 404 and contacts the enterprise server 104 at step 730. For example, the control unit 161 may cause the message generator 160 to generate a control e-mail message with the update and transmit it via the interface 168. Alternatively, the remote server 152 could simply dial in to a toll free number at the enterprise server 104 to deliver the information. The enterprise server 104 then receives the update, translates the message, updates its database 116, and distributes the updates to the watching parties at step 732. Calls to the user whose position is being tracked can then be forwarded according to the location-presence rules. As noted above, this can include forwarding to one or more telephony or messaging devices.

FIG. 7C illustrates an alternate embodiment of the present invention. In particular, in FIG. 7C, the remote device 150 merely transmits location information to the remote server, which then performs the location-presence rules check(s). At a step 740, the remote device 150 receives position information via its position receiver 504. As noted, above, the position receiver 504 may be adapted to receive one or more position signals from a global positioning network 1006. At step 742, the wireless control unit 502 contacts the remote server 152 and transmits the received coordinates or position information. At step 744, the remote server 152's control unit 161 stores the information at the presence-location database 404 and accesses the rules database 402 to determine if the user's location has changed. If it has, then the message generator 160 composes a message including the update information, which is sent to the enterprise presence server 104. As noted above, the message may be an e-mail message. Alternatively, the message may be in a format similar to that received from the remote unit and the communication is via a telephone dial up. At step 750, the enterprise server 104 then updates its database 116 and provides the newly updated presence information to other enterprise and remote users, as necessary. Calls to the user whose position is being tracked can then be forwarded according to the location-presence rules. If, in step 746, there was no location change, the system would simply continue to monitor, in step 752.

In the embodiments discussed above, the location and/or presence information is provided to the enterprise via a remote server 152. The remote server can be provided by a cellular service provider, for example. Each enterprise can be associated with a toll free number at the remote server and transmits the positioning data by calling this number. The remote server then uses its message generator to generate, for example, an e-mail message to the enterprise server. It is noted that, in other embodiments, the generated message could be a text message such as an IM message or an SMS message. Alternatively, the enterprise server could also be equipped with a dedicated phone line for receiving the information.

Figures 8A, 8B:
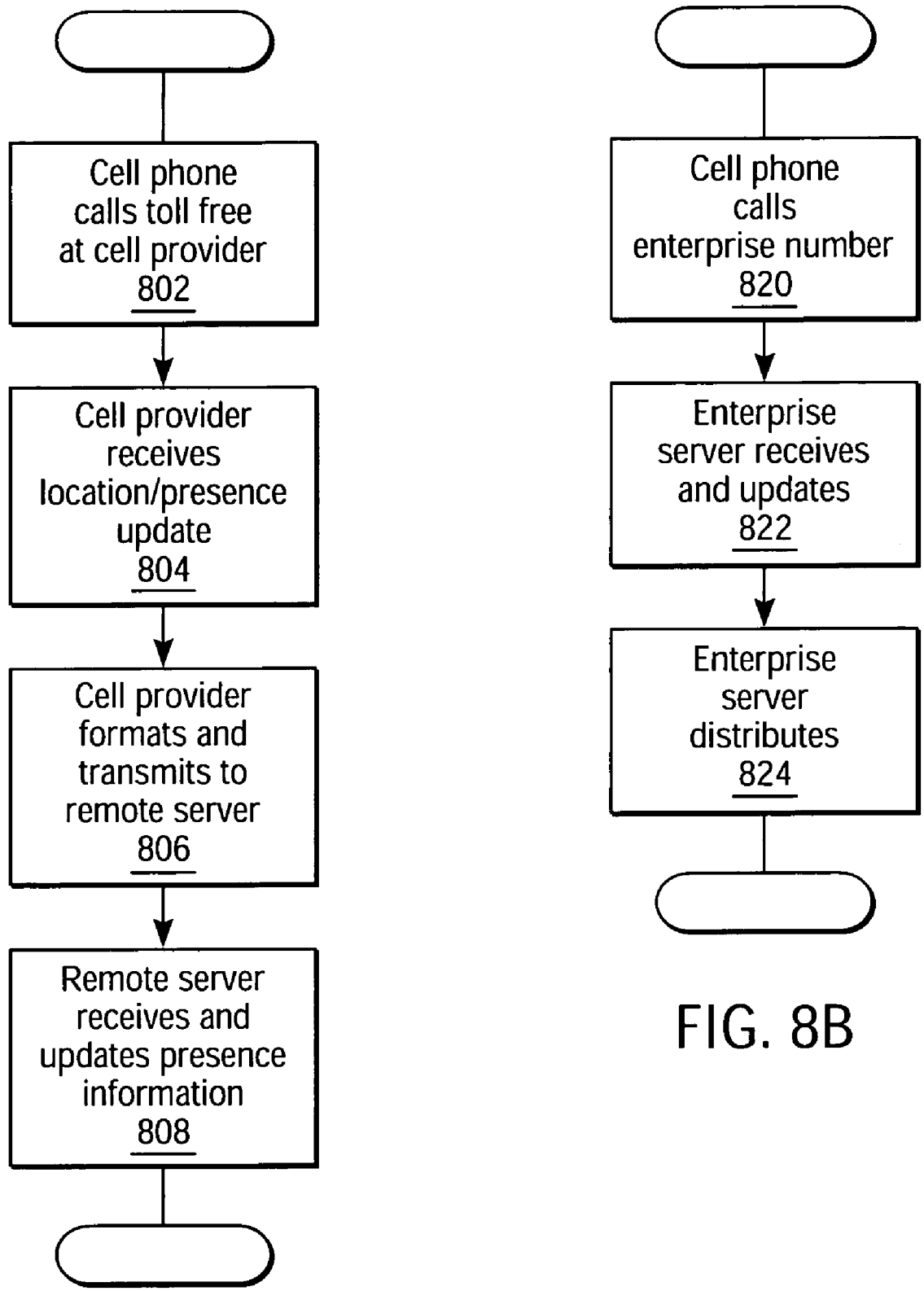
FIGS. 8A-8B are flowcharts illustrating operation of embodiments of the present invention.

This is generally illustrated with reference to the flowchart of FIG. 8A. As shown in FIG. 8A, once the remote unit 150 receives the location information, in step 802, it can contact the remote server 152 via a toll-free dial up, for example, through the cellular and/or public switched telephone networks. At step 804, the remote server, 152, which may be a service provided by the cellular or PCS service provider, receives the location and/or presence update. At step 806, the remote server 152 formats the received information into an appropriate format, e.g., an e-mail format, and transmits it to the enterprise server 104. The enterprise server 104 receives it and updates the presence information, as discussed above, in step 808.

In the alternative, as shown in FIG. 8B, the function of the remote server and the enterprise server could be combined in a single unit at the enterprise site. In this case, the enterprise server 104 would be provided with an interface for receiving calls from the remote devices. For example, a modem card could be provided, with a dial in. In this case, as shown at step 820, the remote device 150 calls the enterprise number with location and/or presence updates. At step 822, the enterprise server 104 receives the updates and distributes them to requesting parties on the network, e.g., as a SIP message, at step 824, in manner similar to that discussed above.

Service Provider Central Server

As noted above, according to embodiments of the present invention, the various of the presence and location server functions may be provided by either the enterprise or the service provider. FIGS. 9-12 illustrate in greater detail an embodiment in which location-presence services are provided by a remote cellular service provider.

Figure 9:
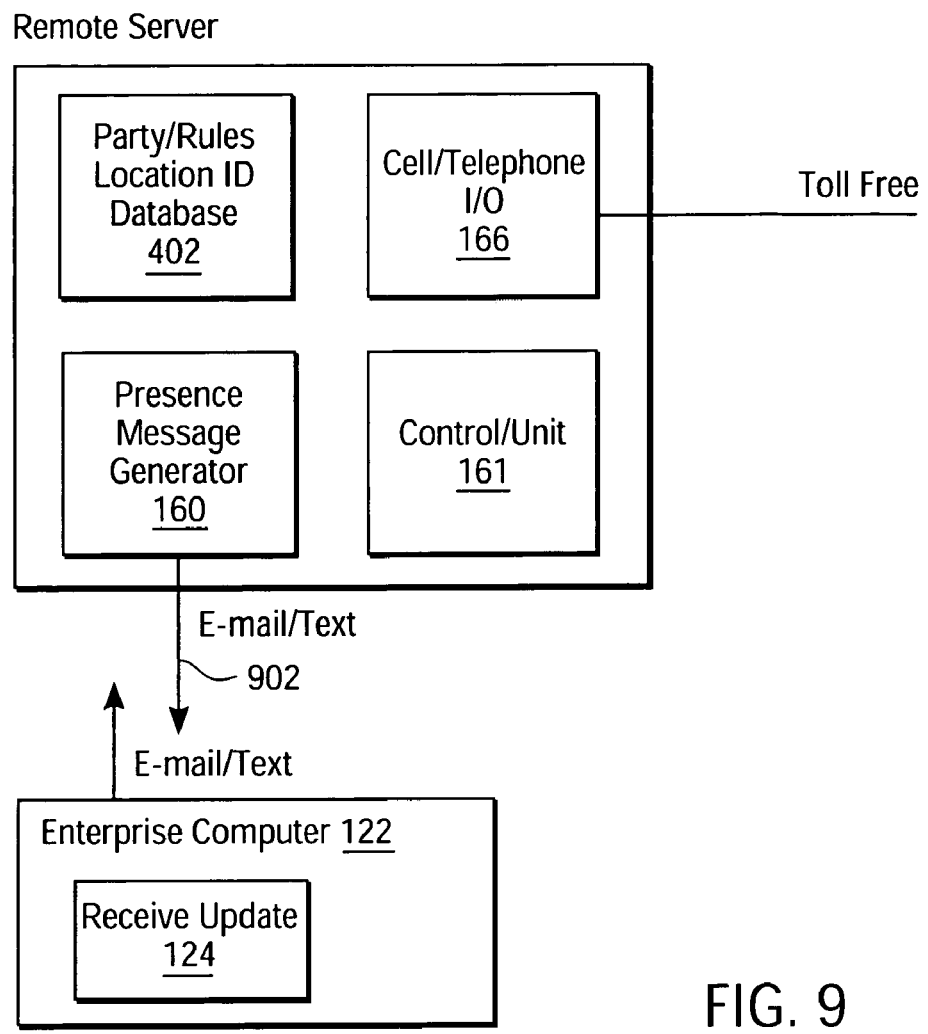
FIG. 9 is a block diagram illustrating an embodiment of the present invention.

For example, as shown in FIG. 9, presence server is shown which may be implemented as a centrally-hosted function by a service provider as a service to customers. In the embodiment illustrated, status updates are received via a dedicated toll free number and then provided to enterprise devices via e-mail or text messages. Similarly, program updates may be received as e-mail or text messages and then transmitted to the remote devices.

In FIG. 9, a server 900 is shown. The server 900 includes a telephone interface 166, a control unit 161, a party-rules database 402, and a presence message generator 160. The telephone interface 166 may be a telephone interface, such as a modem, accessible via a dedicated toll-free number for each enterprise. Also shown is an exemplary enterprise client computer 122.

In operation, when the remote device 150 has a presence status update to transmit to an enterprise client, the remote device 150 dials in to the toll-free number and transmits the information to the server 900. The control unit 161 then accesses the rules database 402 and the presence message generator 160 generates a message 902 to the enterprise containing the status update. The message may be in a variety of formats. For example, the message may be in an e-mail format, or a text massage format such as an SMS format, an IM format, and the like. The status e-mail may be directed to either a particular network client 122 or to the enterprise server 104. If it is directed to a particular network client, the enterprise server or the gateway will simply forward the message to the one or more network clients. Otherwise, the message may be directed to the enterprise server; the enterprise server can then read the message and use the information to update watch lists and presence status, etc.

As noted above, the enterprise and the remote server can share various of the presence-location responsibilities. For example, in one embodiment, the remote server 900 can handle all location-presence functions. In this case, the database 402 includes not only party rules, but also the presence status; this information is transmitted in the e-mail updates to the enterprise site. Alternatively, the remote server 900 could merely form a conduit for location information and send location updates to the enterprise according to the rules database. The enterprise server then updates the presence information.

Similarly, the enterprise client computer 122 may also compose a message such as an e-mail message including, for example, program updates or rule updates for transmission to the remote server 900. The update can be either in the body of the e-mail or as an attachment. The e-mail message is received at the remote server 900. The remote server 900 then identifies the sender and recipient; and reads the e-mail. If the e-mail contains a rules update, then the database 402 is updated. The remote device may also be called via the interface 166 and the update uploaded to the device. A program update is handled similarly.

Figure 10A:
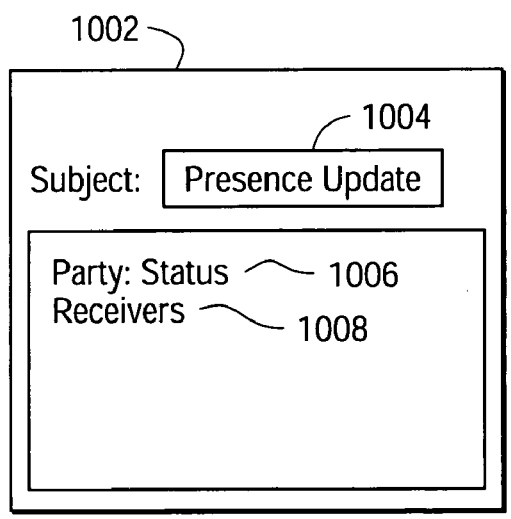
FIG. 10A and FIG. 10B illustrate exemplary control e-mails according to embodiments of the present invention.
Figure 10B:
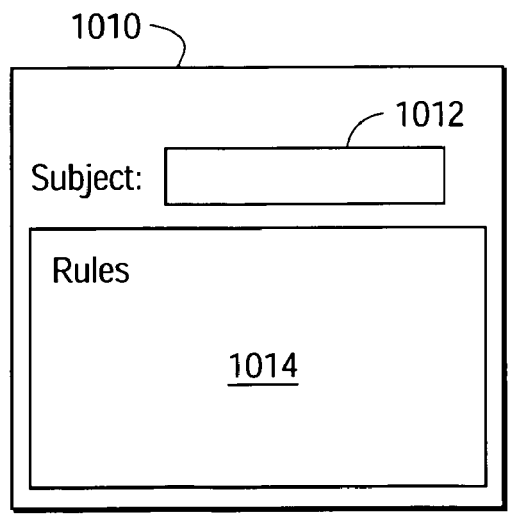

Turning now to FIG. 10A and FIG. 10B, diagrams of exemplary update e-mails according to embodiments of the present invention are shown. Shown in FIG. 10A is an exemplary presence update e-mail 1002. The presence update e-mail 1002 is generated by the message generator 160 to provide the update to the enterprise clients 122.

In the embodiment illustrated, a subject line 1004 identifies the message as a presence update message. The body of the message can include party status 1006 and recipients 1008. Alternatively, the TO: line can identify the parties who shall receive the update.

Similarly, FIG. 10B illustrates an exemplary rules update e-mail message 1010. The rules update e-mail message can be generated at the client 122 and transmitted to a predetermined e-mail address associated with the server 900. The message 1010 may include a subject header 1012 identifying the message as a rules update message, while the body 1014 may contain the actual update content.

Figures 11, 12:
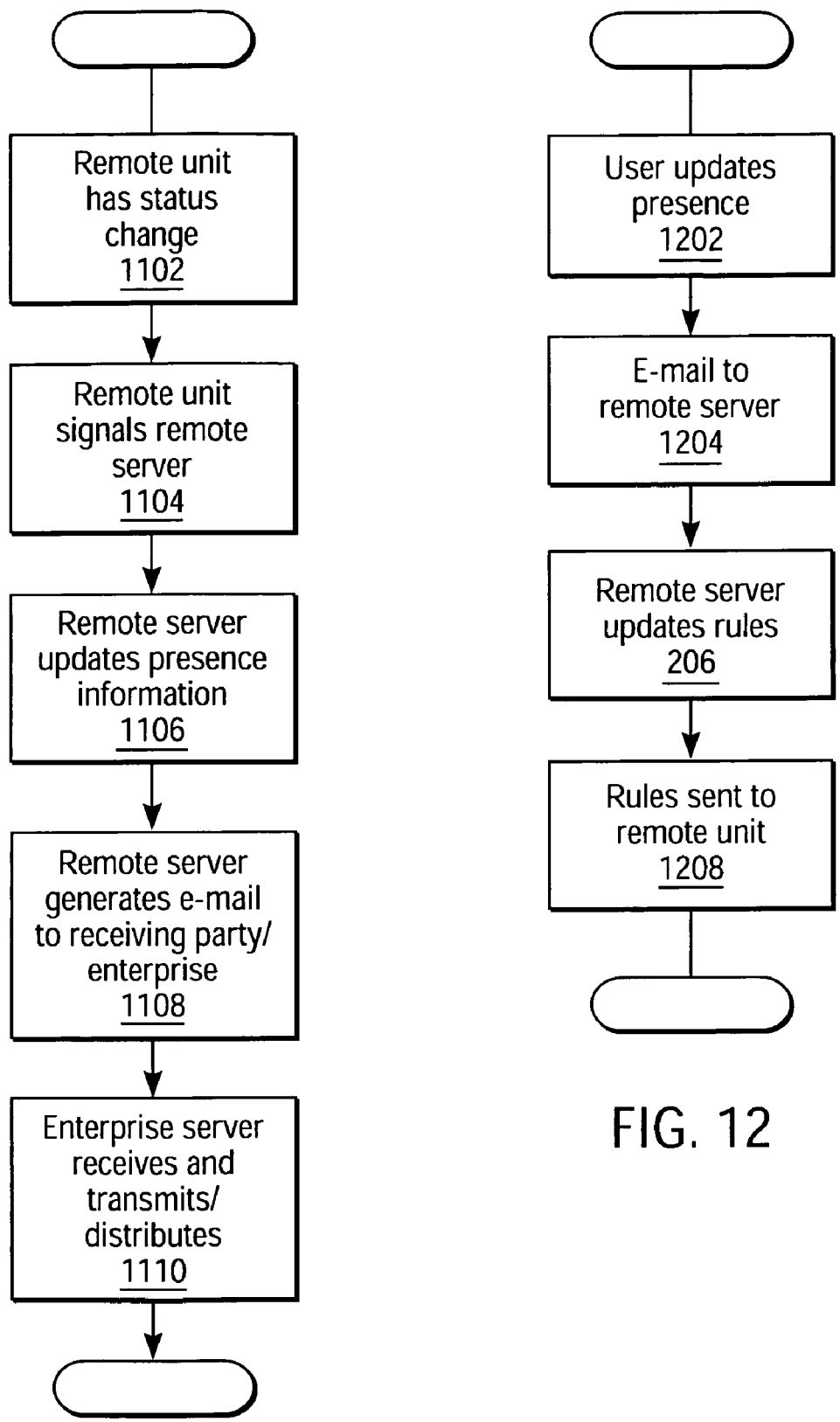
FIG. 11 is a flowchart illustrating operation of an embodiment of the present invention.
FIG. 12 is a flowchart illustrating operation of an embodiment of the present invention.

FIG. 11 is a flowchart illustrating operation of an embodiment of the present invention. In particular, FIG. 11 illustrates transmission of presence updates according to an embodiment of the present invention. At step 1102, the remote unit 150 has a status change, i.e., detects a change in position. At 1104, the remote unit 150 signals the remote server with the change. For example, the remote unit 150 can dial a toll-free number to establish a telephone or data connection via interface 166. At 1106, the remote server 900's presence control unit 162 updates the presence database with the presence information. At step 1108, the remote server 900's presence message generator 160 is used to generate an e-mail or other message for the enterprise. At step 1110, the enterprise receives the update and it is distributed to the appropriate parties. As noted above, the e-mail may be addressed to individual parties or to a central enterprise server which then distributes its contents.

Turning now to FIG. 12, a flowchart illustrating rules updating according to an embodiment of the present invention is shown. At step 1202, the enterprise client user 122 updates his presence rules. For example, as discussed above, the user may input one or more rules changes into his computer or other network device. At step 1204, the update contents are sent as an e-mail to the remote server 900. At step 1206, the remote server 900 receives the contents and updates its database. At step 1208, the rules updates may be provided to the remote unit.

Interfacing to the Remote Device

As discussed above, according to embodiments of the present invention, presence-position and software updates may be transmitted to and from the remote device via a cellular telephone dial-up. That is, to report changes in position, the remote device 150 may dial a toll free number associated with either the remote or enterprise server and using a modem (or similar device on a digital channel), transmit the position information on the voice channel. However, other cellular data technologies may be used. In other embodiments of the invention, any radio data network may be used, such as the cellular control channel (e.g., using SMS or CDPD technologies); wireless LAN technologies (e.g., Wi-Fi or IEEE 802.11a, b, g); or two-way radio technologies may be employed for sending and receiving the presence or update information.

Figure 13:
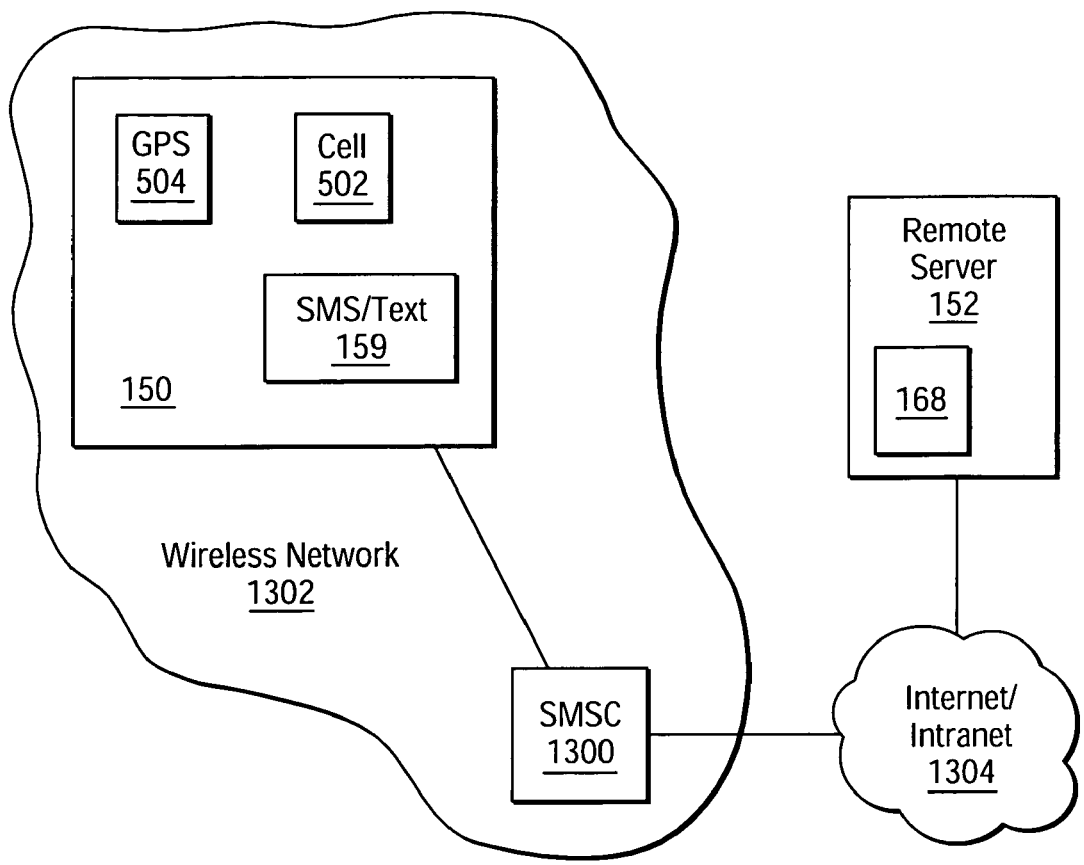
FIG. 13 is a diagram schematically illustrating operation of an embodiment of the present invention.
Figure 14A:
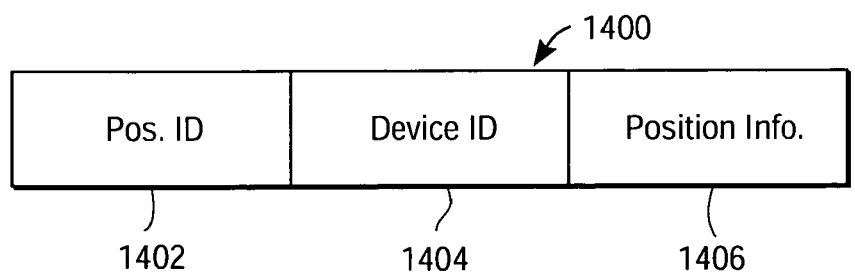
FIG. 14A and FIG. 14B illustrate exemplary SMS messages according to an embodiment of the present invention.
Figure 14B:
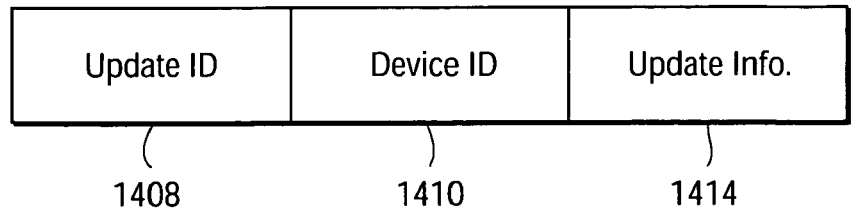
Figure 15:
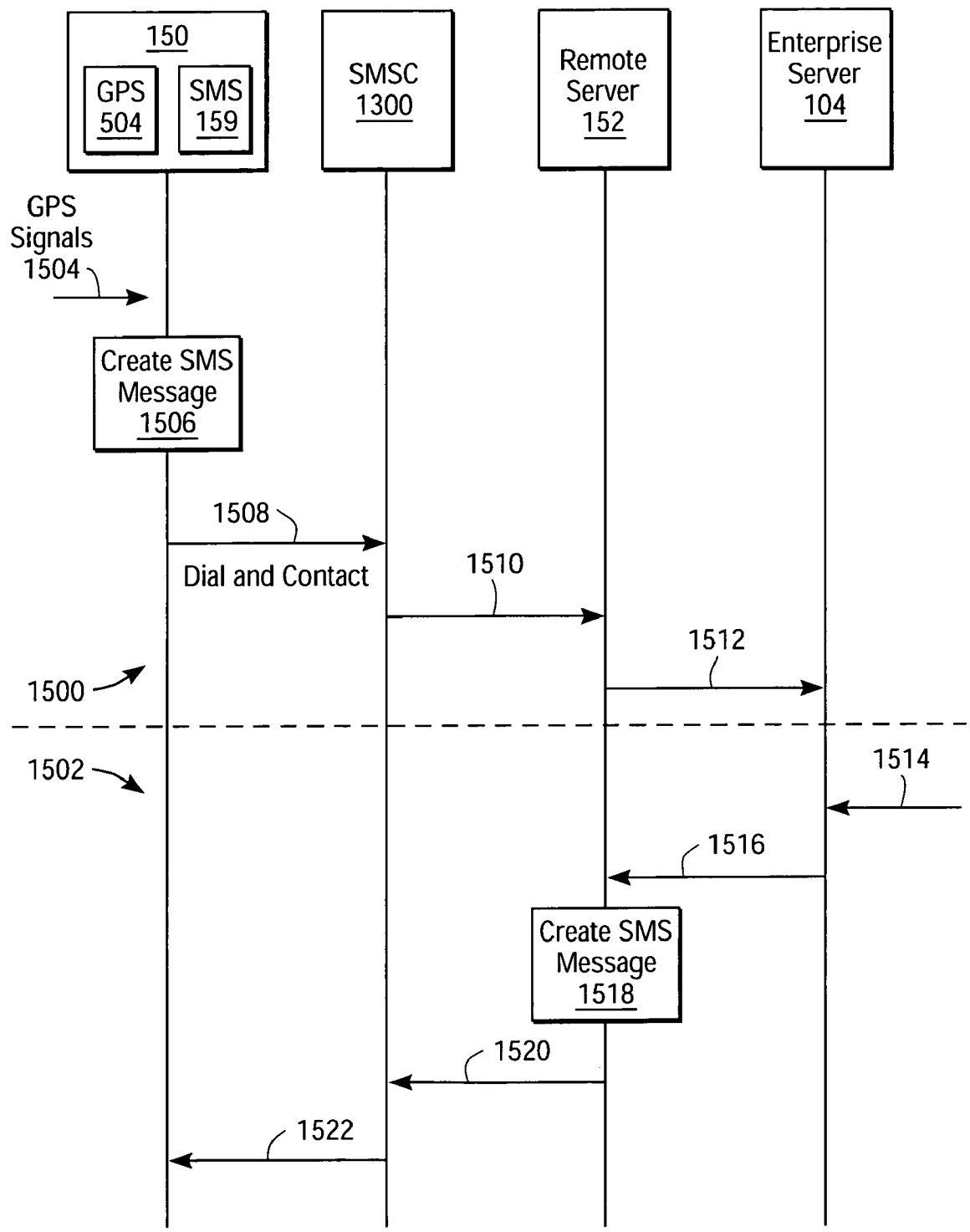
FIG. 15 is a signaling diagram illustrating operation of an embodiment of the present invention.

In FIGS. 13-15, operation of such embodiments will be discussed with reference to an SMS-based system. In particular, FIG. 13 illustrates an exemplary network configuration for such an embodiment. FIG. 13 illustrates a system in which a data communications network such as a Short Message Service (SMS) is used for position and software update transmission. As noted above, other data transmission systems may be employed, however.

Shown are a remote device 150 and a server 152. Also shown are a wireless network 1302, an SMSC 1300, and Internet/Intranet 1304. As will be explained in greater detail below, the remote device 150 receives positioning signals (not shown) from a positioning network and transmits them via the wireless network 1302 to the SMSC 1300. The SMSC 1300 then transmits the message over Internet/Intranet 1304 to the server 152.

In the embodiment illustrated, the remote device 150 includes GPS receiver 504, cellular transceiver 502, and a data interface 159, such as an e-mail or text messaging interface. As illustrated, the interface is particularly SMS control unit 159. Similarly, remote server 152 includes interface 166, which is an interface for receiving the SMS messages via Internet/Intranet 1304. Similarly, the remote server 152 can send updates to the remote device 150 as SMS messages.

Exemplary SMS messages are shown in FIG. 14A and FIG. 14B. It is noted that such messages may be embodied as text or data messages. Shown in FIG. 14A is an exemplary SMS status message 1400. As discussed above, such a status message may be received from the remote unit 150. As shown, a status SMS message 1400 can include an identifier 1402 identifying the message as a position status message; a device identification 1404 identifying the transmitting device; and the corresponding position information 1406. Similarly, a rules update message is shown in FIG. 14B. The rules update message is sent from the remote server 152 to the remote device 150 to update the presence/location rules. As shown, the message includes an update identifier 1408 identifying the message as an update message; a device identifier identifying the destination device; and the update information 1414.

Operation of an embodiment of the present invention is shown with reference to the signaling diagram of FIG. 15. Shown are remote device 150, SMSC 1300, Remote Server 152, and Enterprise Server 104. It is noted that other network configurations are possible. Thus, the figure is exemplary only. Shown at 1500 is the remote device 150 receiving GPS signals and transmitting corresponding information to the enterprise server 104. Transmission of software/firmware updates to the remote device 150 is shown at 1502.

At 1504, the remote device 150 receives one or more position signals, i.e., GPS position signals. The SMS controller 159 receives position and/or presence signals from the GPS receiver 156, and converts them into the proper SMS message format at 1506, as discussed, for example, with reference to FIG. 13. The SMS controller 159 then dials the appropriate contact number at the remote server 152, at 1508. The SMS message travels on the cellular control channel to the SMSC 1300, which then forwards it to the remote server 152, at 1310. The remote server 152 may then pass the message on to the enterprise server 104, at 1512. As discussed above, the remote server 152 may transmit the information as an e-mail or other message. The enterprise server 104 may then process and distribute the presence information accordingly.

Transmission of updates to the remote device 150 is shown at 1502.

At 1514, the enterprise server 104 receives one or more program updates or location rule updates from the network client (FIG. 1). The enterprise server 104 can receive the updates, for example, in a network format such as SIP format. Once received, the enterprise server 104 transmits the update to the remote server 152, at 1516. At 1518, the remote server 152 converts the received update into a network transmission format, such as SMS format. At 1520, the remote server 152 dials the remote device cell number and transmits the SMS message over the cellular control channel to the SMSC 11300, which then forwards it to the remote device 150.

Remote-Device Based Compare

As noted above, the remote device 150 may itself receive rules updates from network clients via the remote server 152. In certain embodiments, the remote device 150 may also perform the location and/or presence compare operations. In such embodiments, the remote device 150 may then need to signal the remote server 152 only when a change in status occurs, such as the remote unit leaving a location defined by a perimeter, boundary, range, or presence rule defined by the user.

Figure 16A:
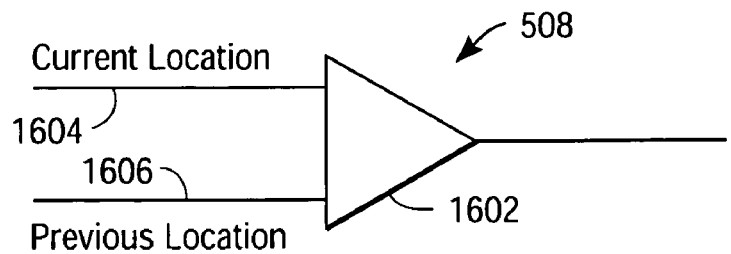
FIG. 16A-FIG. 16C illustrate exemplary remote devices according to embodiments of the present invention.
Figure 16B:
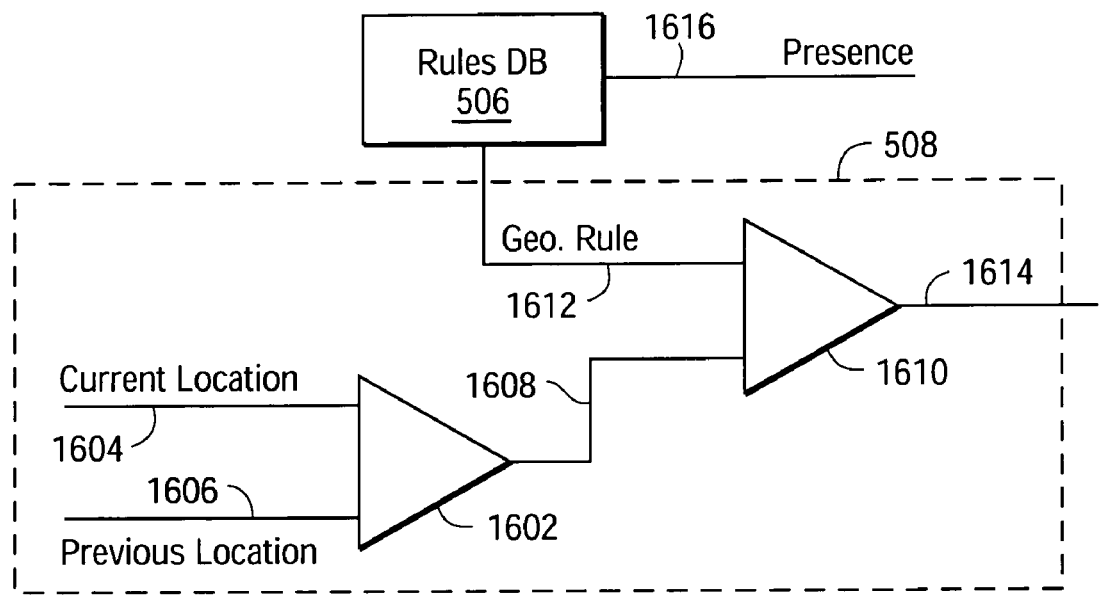
Figure 16C:
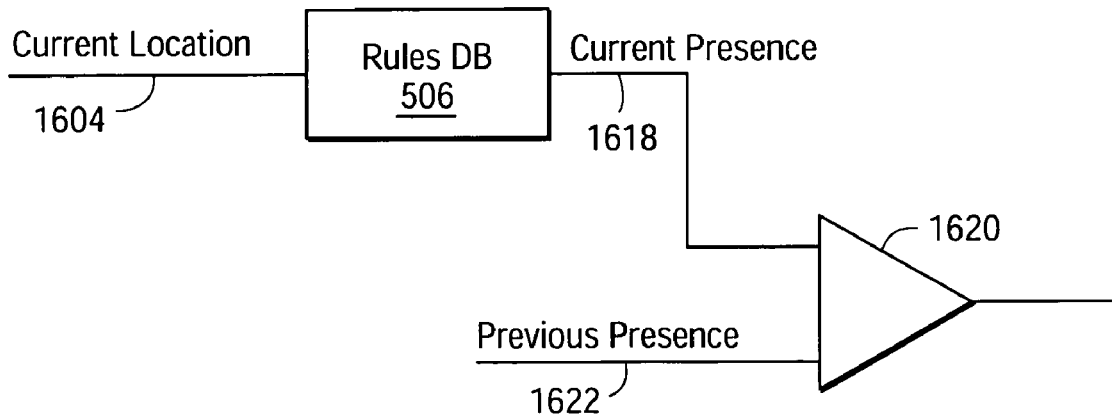

Remote device based compare units are shown schematically with reference to FIGS. 16A-16C. Shown in FIG. 16A is an exemplary location rules compare unit 508 that functions to identify if there has been an update in the user's current location. The unit 508 includes a comparator 1602 that receives as inputs a current location 1804 and a previous location 1606. In operation, the remote unit 150 receives the location signals corresponding to the current location and input them to the comparator 1602. The remote device 150 also accesses memory (not shown) for the previous location, which is also sent to the comparator 1602. The comparator 1602 determines if there has been a significant change in the user's location from the previous location. If so, the comparator 1602 may output a signal 1608 directing the remote device 150 to transmit to the remote server 152. Otherwise, no action is taken.

Figure 18:
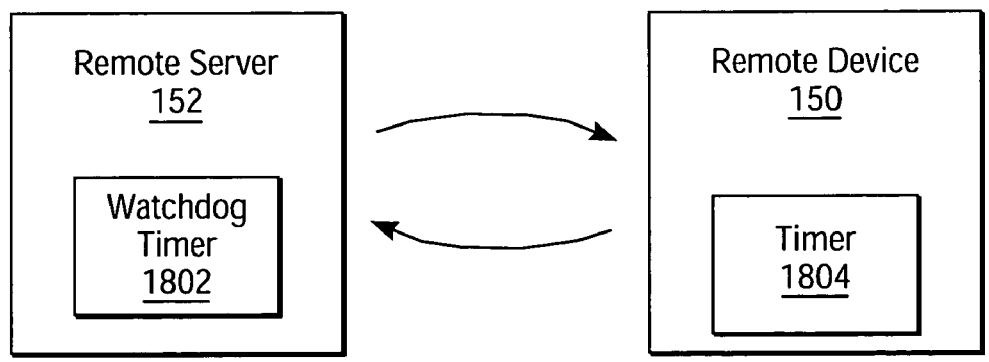
FIG. 18 is a diagram illustrating an embodiment of the present invention.

FIG. 16B illustrates another exemplary location rule compare unit 508. In the embodiment illustrated, the unit 508 compares the location and a rule and outputs to the presence unit if there is a change. Thus, as shown in FIG. 16B, the location rules compare unit 508 includes comparator 1602 receiving current location 1604 and previous location 1606 inputs. The comparator 1602 functions as described with reference to FIG. 18A, and provides an output 1608 representative of whether there has been a change in position. The signal 1608 is provided to a comparator 1610. The other input to the comparator 1612 is a geographic rule 1612 from the rules database 506. The comparator 1610 then provides an output 1614 representative of whether there has been a change to a geographic rule. This signal may then be provided to the remote server. Alternatively, the output 1614 may be provided to the database controller 506 to determine if there is an associated presence update. If so, this will be provided to the remote server, at 1616.

As noted above, either the location or presence may trigger an update signal to the remote server. FIG. 16C illustrates an embodiment in which a presence update triggers a signal to the remote server. As shown, the current location 1604 is input to the rules database 506. The rules database 506 accesses the current presence rule and outputs it at 1618. The current presence state is input to comparator 1620, as is the previous presence rule 1622.

Figure 17:
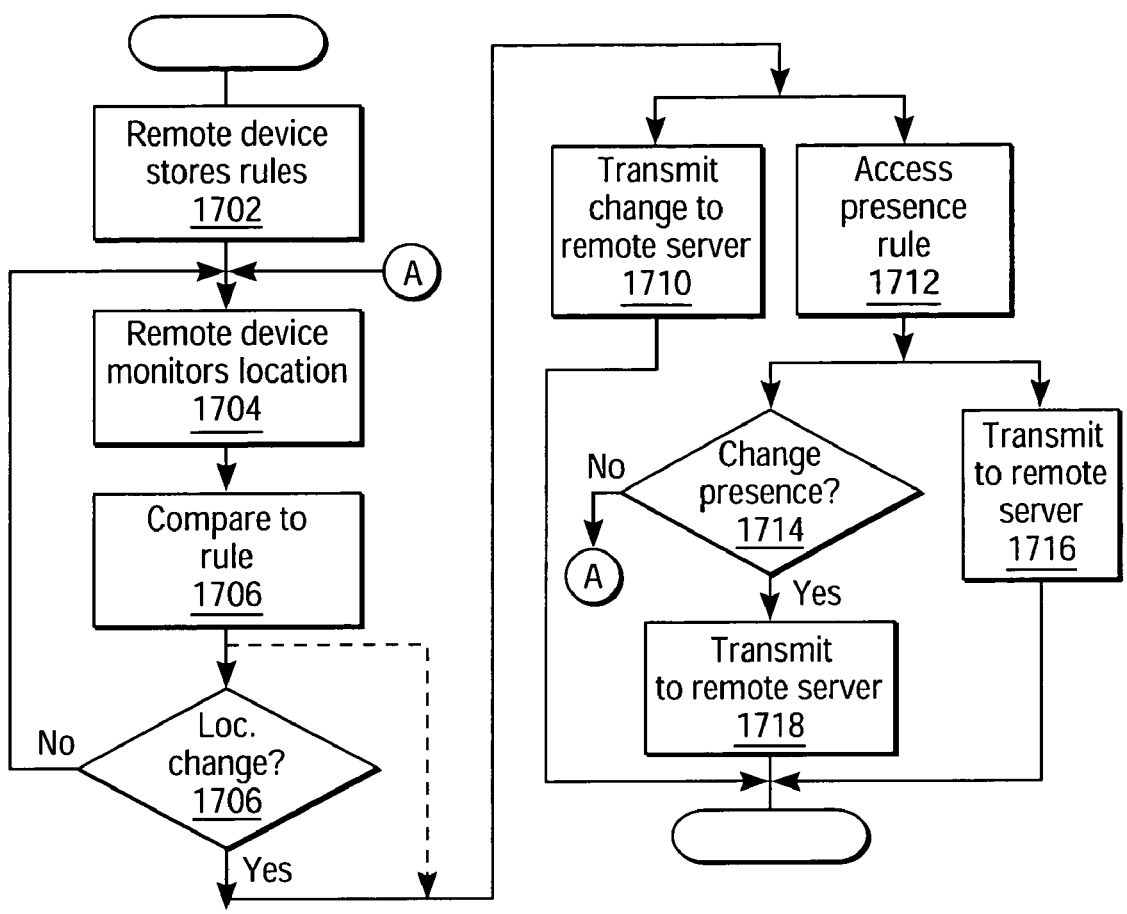
FIG. 17 is a flowchart illustrating operation of an embodiment of the present invention.

FIG. 17 is a flowchart illustrating operation of embodiments of the present invention. At a step 1702, the remote device 150 receives presence-location rules. As described above, the remote device 150 can receive the rules as a cellular data call. The updated rules are then stored in the rules database 506.

At a step 1704, the remote device 150 begins to monitor its current location, such as by receiving global positioning signals. At a step 1706, the remote device 150's location rule compare unit 508 will compare the received location to the corresponding location rule stored in the database 506. If there is not change, as determined in a step 1708, then the remote device 150 will simply continue to monitor the location. If, however, there is a location change, then different actions may occur, depending on the embodiment.

In one embodiment, in a step 1710, the location change is transmitted to the remote server or the enterprise server, which then process the information. Alternatively, in a step 1712, the location rule compare unit 508 can access the rules database 506 for the corresponding presence status rule and determine the current presence state. In certain embodiments, at a step 1716, the remote device 150 will then transmit the accessed current state to the remote or enterprise server. In other embodiments, in a step 1714, the location rules compare unit 508 will determine if there has been a change in the presence state. If so, then in a step 1718, this change, or the new presence state, will be transmitted to the remote or enterprise server. If there has been no state change, then the system continues to monitor location and presence at step 1704.

It is noted that in certain embodiments, the current location may be used to determine whether there has been a presence change, without making an explicit determination of whether there has been a location change. Thus, after step 1706, the system could proceed to step 1712, without an intervening step 1708.

Watchdog Timer

In certain embodiments of the present invention, either or both of the remote units and the server(s) may be provided with a watchdog timer to allow for confirmation the remote units are still running.

Shown in FIG. 20 is an exemplary server, such as enterprise server 104 or remote server 152, and a remote user device 150. The remote device 150 may be provided with a watchdog timer 1804, or the server 152 may be provided with a timer 1802. At periodic intervals, the remote device 150 and remote server 152 may communicate timer ticks with one another, for example, by calling the toll-free or user device telephone numbers.

In one embodiment, the remote unit 150's timer 1804 maintains a predetermined count; when the timer expires, the remote unit 150 sends a current location and/or presence or status change to the remote server 152. Thus, the remote unit 150 sends location and/or presence updates to the remote server 152 on a periodic basis.

In another embodiment, the remote server 152's timer 1802 maintains a count when a user device 150 is detected. Upon expiration of the timer, the server 152 sends a "here I am" signal to the remote user, requesting that it send a location and/or presence update; alternatively, the "here I am" signal could merely indicate that the remote unit 150 should send a response tick, until an actual location or presence change occurs, at which point the remote unit 150 sends the updates. Such timer tick signals may be sent, for example, on cellular control channels. If the remote server 152 does not receive a response to its timer tick, it can update the corresponding remote unit's presence status to "unknown" or "unavailable" or otherwise indicate that the remote user has not responded to the timer tick status request.

Figure 19A:
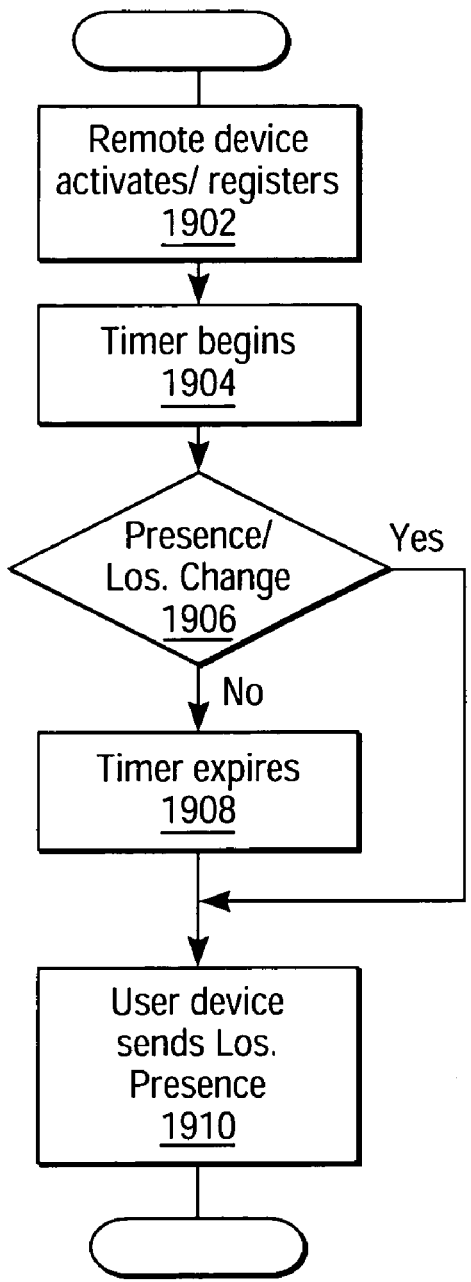
FIG. 19A-FIG. 19C are flowcharts illustrating operation of embodiments of the present invention.

FIG. 19A is a flowchart illustrating operation of an embodiment of the present invention. In particular, as shown, the remote device is provided with a timer and periodically sends updates to the remote server 152. As shown, at a step 1902, the remote device 150 activates or otherwise registers with the remote server 152 and begins monitoring location and/or presence status. For example, in the case of a cell phone, the device 150 detects and registers with a base station (not shown) in a known manner and can then send an initial location-presence indication to the remote server 152 in a manner similar to that described above. At a step 1904, the remote device 150 can activate its timer 1804. At a step 1906, the remote device 150 may determine that its location and/or presence status has changed. If so, then in step 1910, the remote device 150 will transmit the change to the remote server 152, and the timer 1804 will be reset. Otherwise, in step 1908, the timer 1804 will expire, and will cause the user device 150 to transmit its current location and/or presence status, in step 1910. Again, the timer will reset. It is noted that, in certain embodiments, no location or presence change will be transmitted to the remote server until the timer expires, even if a change is detected during the countdown. Further, in other embodiments, the remote device will send a location or presence information to the server upon expiration of the timer, regardless of whether there has been a change or a determination of a change since the previous transmission.

Figure 19B:
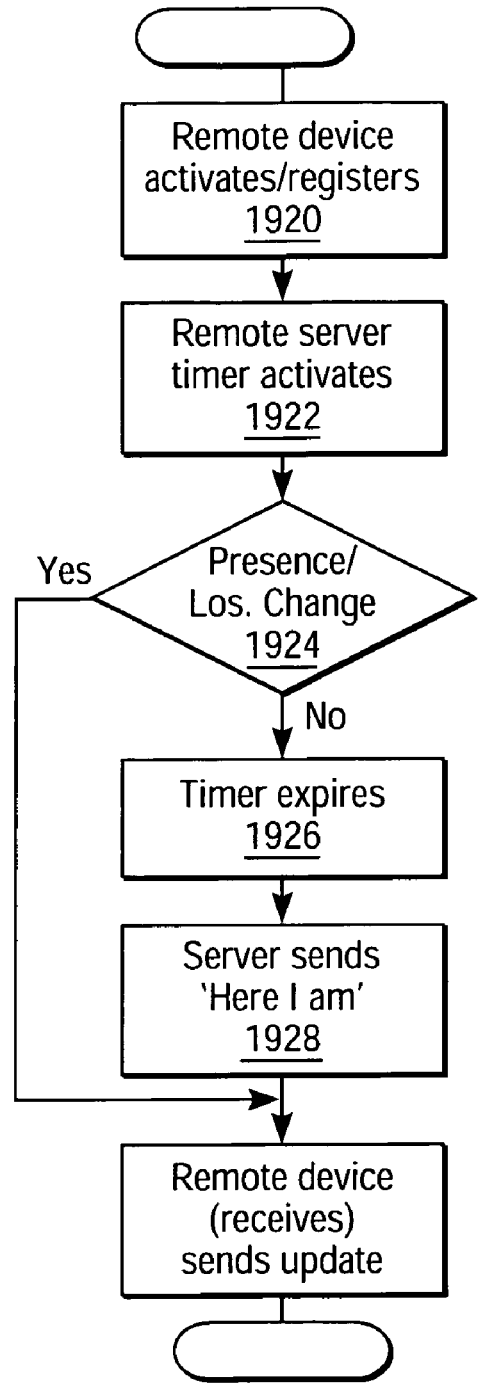

FIG. 19B is a flowchart illustrating alternate use of a timer tick system according to an embodiment of the present invention. At a step 1920, the remote device 150 activates or otherwise registers with the remote server 152, and begins location and/or presence monitoring. In response, at a step 1922, the remote server 152 activates its timer 1802. Next, in a step 1924, in certain embodiments, the remote device 150 determines if there has been a presence or location change prior to expiration of the timer. If so, then in step 1930, the remote device 150 sends an update to the remote server 152. Otherwise, in a step 1926, the timer expires. At a step 1928, the remote server 152 then sends a timer tick or "Here I am" signal to the remote device 150. The remote device 150 receives the signal and, in response, can check and send the current location and/or presence status. If no response is received, the remote server 152 can update the user's presence status to "unavailable" or "unknown." Again, in certain embodiments, the remote user will not update the remote server 152 until reception of the timer tick signal, even if there is a change in status prior to receiving it.

Figure 19C:
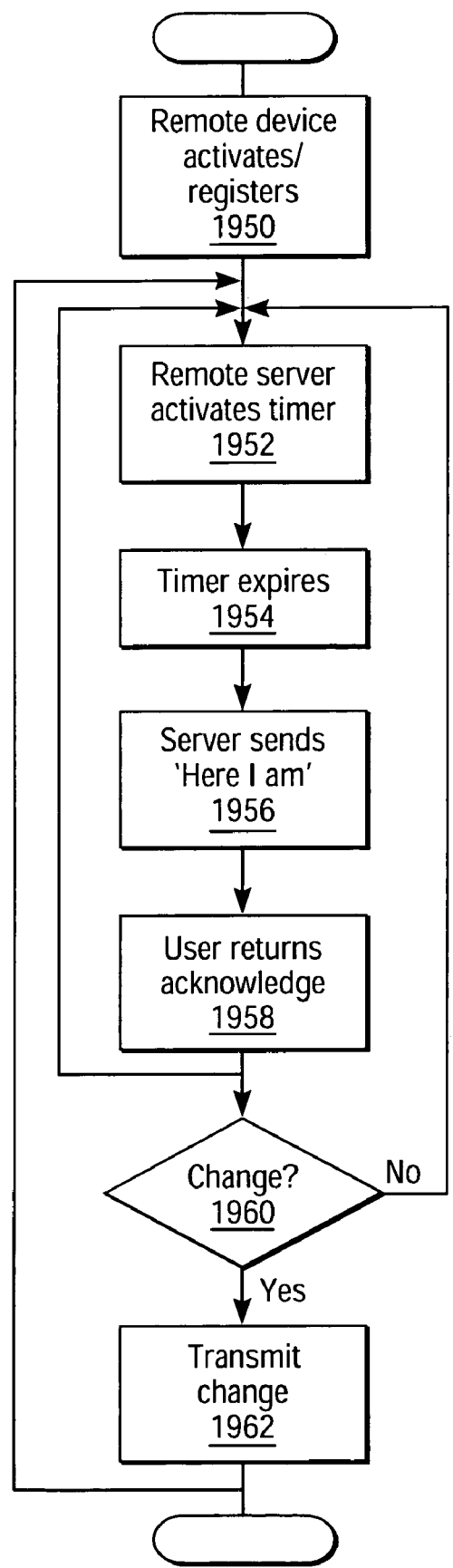

FIG. 19C is a flowchart illustrating another alternate use of a timer tick system according to an embodiment of the present invention. As shown, at a step 1950, the remote device 150 activates or otherwise registers with the remote server 152, and begins location and/or presence monitoring. In response, at a step 1952, the remote server 152 activates its timer 1802. At a step 1954, the timer 1802 can expire. When it does, the remote server 152 sends a timer tick signal, in a step 1956. In a step 1958, the remote device 150 can send a response tick. If no response is received, the remote server 152 can update the user's presence status to "unavailable" or "unknown." In a step 1960, the remote device 150 can detect a change in presence or location status. If it does, then in step 1962, the remote unit 150 will send an update in status to the remote server 152. Otherwise, it will continue to monitor. The timer 1802 can be reset upon expiration and upon reception of updated status information. It is noted that, in other embodiments, the current status will be transmitted regardless of whether there has been determined to be a change.

Loss of Signal

In certain embodiments of the present invention, it may be the case that a global positioning signal is not received when a user is inside a building. In such a case, the system according to embodiments of the present invention may determine that the user is in a building at an address associated with a position where the signal faded or was lost.

Figure 20A:
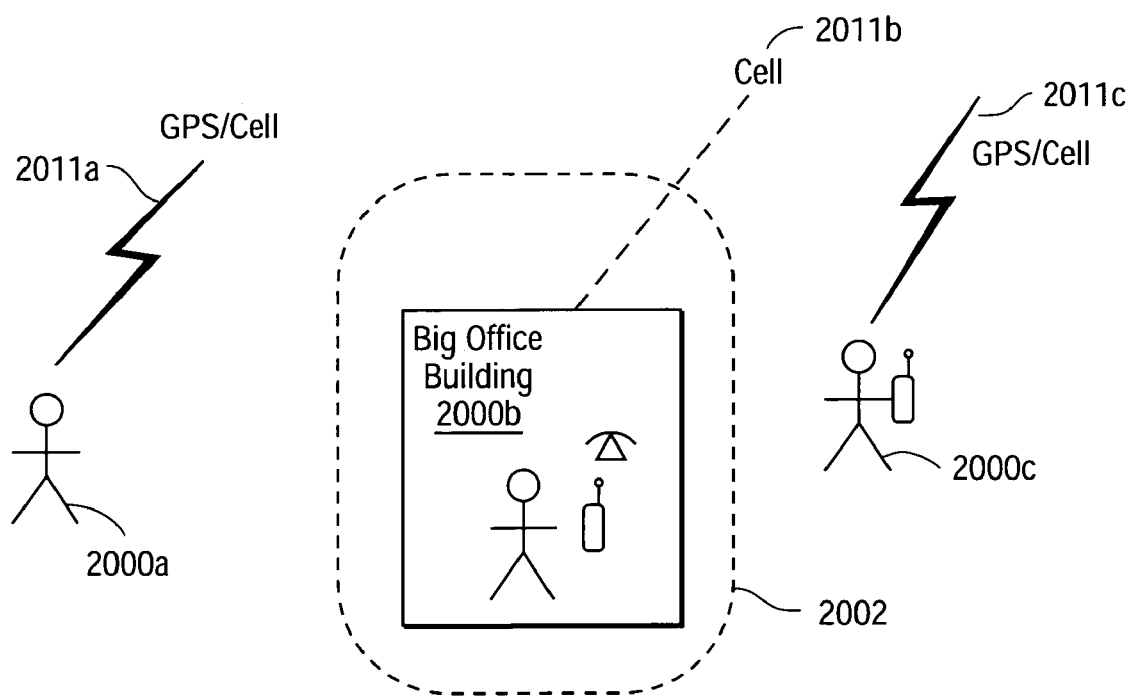
FIG. 20A-20B schematically illustrate embodiments of the present invention.

This is illustrated schematically in FIG. 20A. As shown at 2000a, a user is normally able to receive both GPS signals and cell phone signals 2011a. At position 2000b, the user may be within a building and thus receive only cell phone signals 2011b. When the user exits the building, at 2000c, the user again receives both GPS and cell phone signals 2011c. In operation, the system may assign an address to the user when the user is tracked to a point where the GPS signal is lost. For example, at perimeter 2002, the GPS signal may be lost or fall below a predetermined threshold. In this case, the user may be "assigned" a location closest to the one where the signal was lost. Alternatively, the position the signal was lost may be compared to a known address, and the user may be assigned that address over the period during which the signal is lost. Further, when the user is deemed to be at such a location, contact information may also be updated. Thus, when the signal is lost at 2002, the user's contact information may be switched from his cell phone to an office telephone number.

Figure 20B:
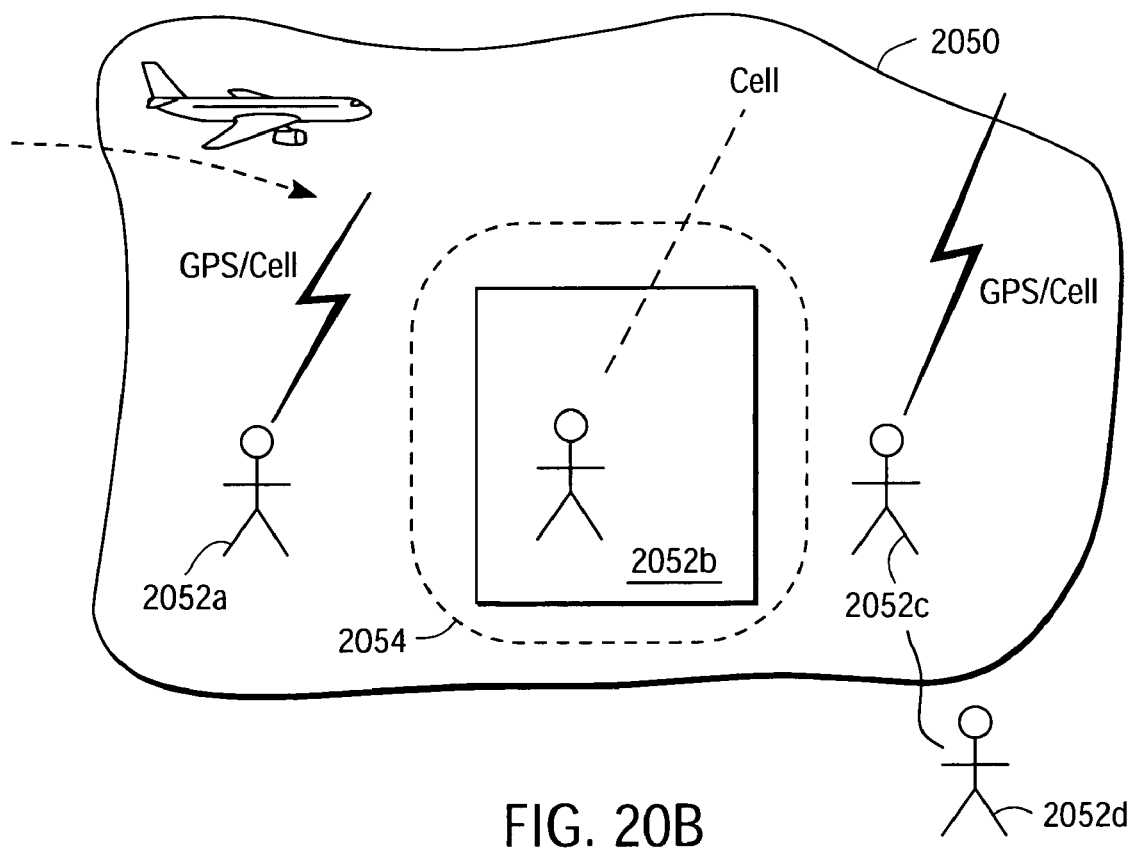

It is noted that, while in some cases it may be desirable to update location and presence each time the signal is lost and regained, in other cases the location at which the signal is lost may be a subset of another position related to presence. This is illustrated in FIG. 20B. Shown in FIG. 20B is an area 2050 that may be associated with a single "location" and presence indicia. For example, the area 2050 may be the city of Munich, and the location can simply be "Munich," with an associated contact telephone number, such as a GSM cell phone. In this case, it would not necessarily be required to continually update the location or presence, since the user's presence status will not change.

For example, at position 2052a, the user is within the area 2050 and hence in "Munich." At position 2052b, the user may be within a building in Munich, where his GPS signal fails. The user's location, Munich, need not necessarily be changed to a more specific one (i.e., the specific address of the building), because the user is still within area 2050. Even when the user's GPS signal is restored at 2052c, the location need not be updated. Only when the user leaves are 2052, e.g., to return home, would the location be updated.

Figures 21, 22:
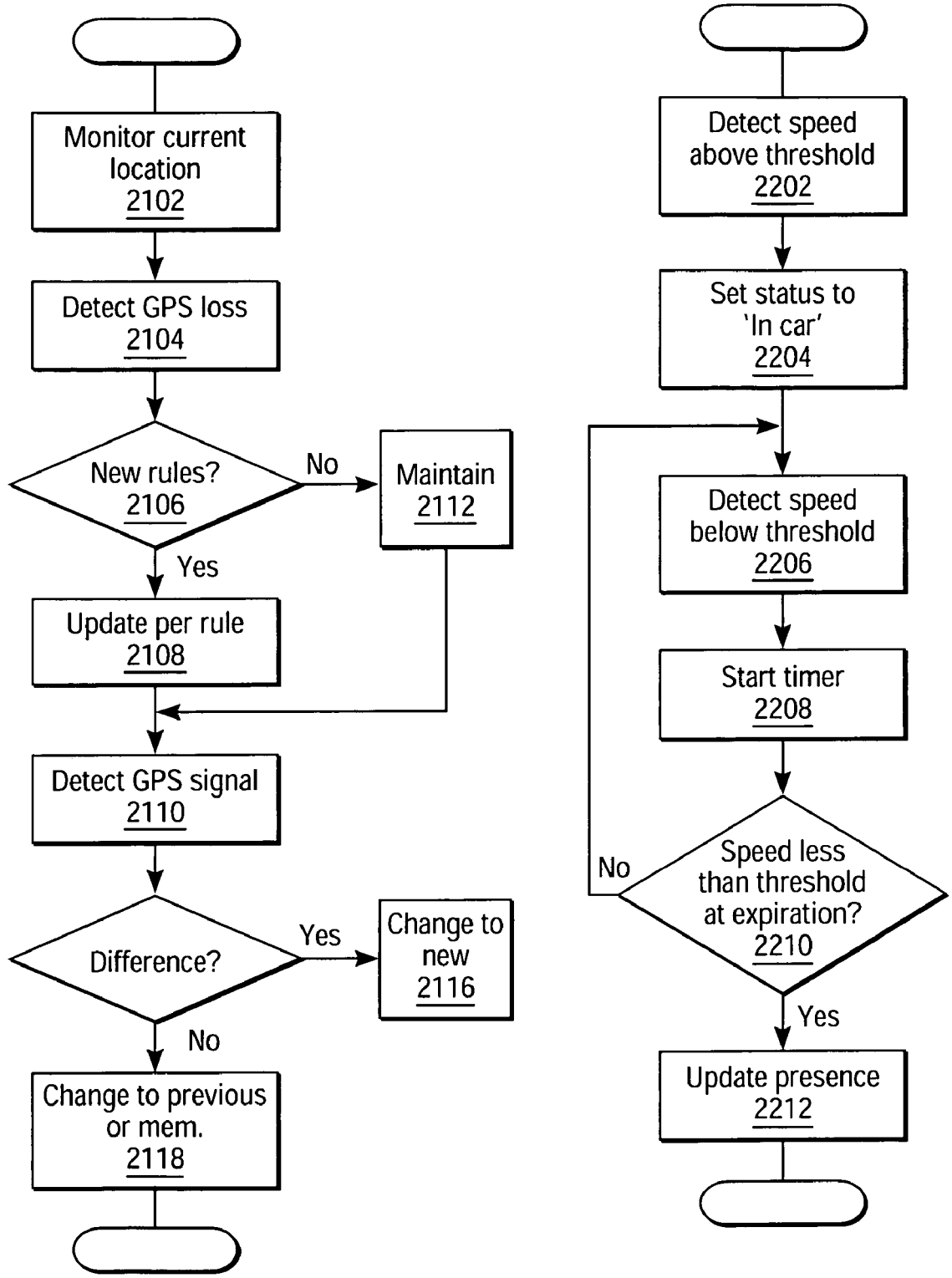
FIG. 21 is a flowchart illustrating operation of an embodiment of the present invention.
FIG. 22 is a flowchart illustrating operation of an embodiment of the present invention.

A flowchart illustrating operation of such an embodiment of the present invention is shown in FIG. 21. At a step 2102, the system monitors the user's current location. At a step 2104, the system detects loss of the GPS signal. For example, the remote device 150 can determine that the signal has fallen below a predetermined threshold. At step 2106, the system checks to see if a new rule is to be implemented in response to the loss of signal. That is, depending on the embodiment, the remote device 150 can check its rules database, or it can simply send a signal to the remote server 152 advising of the loss of the signal. If a new rule is to be implemented, then the user's location and/or presence are updated according to the new rule. Otherwise, the current rule is maintained, in step 2112. Once the new rule has been implemented, the system can detect reception of the GPS signal, i.e., once the user leaves the building, in a step 2110. Again, the remote device 150 can detect if the GPS signal exceeds the threshold. The system will monitor to determine if the received signal indicates that a new rule should be implemented, as shown in step 2114. If so, then in step 2116, the new location rule is implemented. If not, then in step 2118, the old one is maintained.

Hysteresis

As discussed above, embodiments of the present invention can be used to define a user presence status based on user speed. For example, a user speed of, say 15 miles per hour or greater can be associated with a presence status of "In car" and an availability of "cell phone." As can be appreciated, however, particularly when driving in large cities and when stopped at a light or in traffic, the user's speed may not be constantly above 15 miles per hour. Consequently, to prevent continuous toggling, a hysteresis time threshold can also be set and transferred to the remote device.

That is, in certain embodiments of the present invention, when a user is "In Car," the appropriate system component must determine that the user has been traveling at a speed below the threshold for a predetermined period prior to deciding that his presence status has changed.

For example, FIG. 22 is a flowchart illustrating operation of an embodiment of the present invention. At a step 2202, the system detects a user device speed above a threshold T. In certain embodiments, the threshold can be 15 miles per hour and be user-settable, in a manner similar to that discussed above. At a step 2204, the user's presence status is set to "In car." At a step 2206, the remote user is detected as having a speed less than the threshold T. At a step 2208, the system device responsible for setting user status starts a hysteresis timer. If the speed is still less than the threshold upon expiration of the timer, as determined in step 2210, then in step 2212, the user's status can be changed. For example, prior to getting in the car, the user's location and status could have been "In city" and "At lunch," respectively. When the user is detected as moving at speed, the presence status can be updated to "In car." When the user is detected as moving below the threshold for a predetermined period, the presence status can be updated to "At lunch," once more.

It is noted that similar hysteresis timers/thresholds can be provided in association with any of the location-status rules. Such hysteresis timers may be particularly useful in situations in which the GPS signal has been lost due to the user entering a building. To prevent the toggling that would result if the user is, say, waiting at the entrance to the building, moving inside and outside GPS range, hysteresis timers may be provided.

Figure 23:
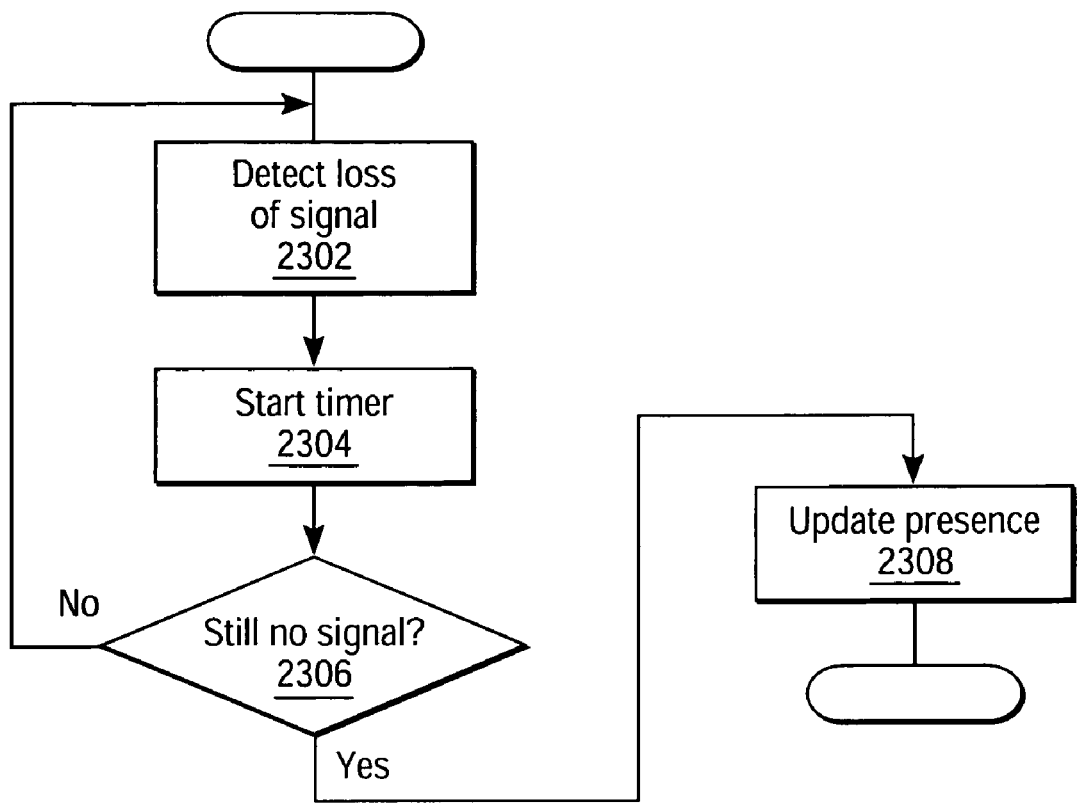
FIG. 23 is a flowchart illustrating operation of an embodiment of the present invention.

This is illustrated more particularly with reference to the flowchart of FIG. 23. As shown, in a step 2302, the system detects a loss of GPS signal. For example, the remote device 150's GPS controller can detect that the GPS signal is below a predetermined threshold. At a step 2304, the remote device 150 starts a hysteresis timer. If there is still no signal upon expiration of the hysteresis timer, as shown in step 2306, then in step 2308, the remote device 150 updates the user's presence status. Otherwise, the system waits for the loss of signal again. A similar process is used if the user moves from a state of "No signal" to "Signal."

Third-Party Monitoring

According to an embodiment of the present invention, an improved third-party location monitoring device is provided. Briefly, in addition to providing the presence capabilities as described above, a remote device according to embodiments of the present invention may be affixed to an object, person, or pet, and set to trigger an alarm if it departs from a user-programmed range. A graphical user interface is provided for setting the range. Rules, presence, location and alarm updates may be transmitted in a manner similar to that discussed above, i.e., wirelessly and/or using e-mail or text messaging techniques.

Figure 24:
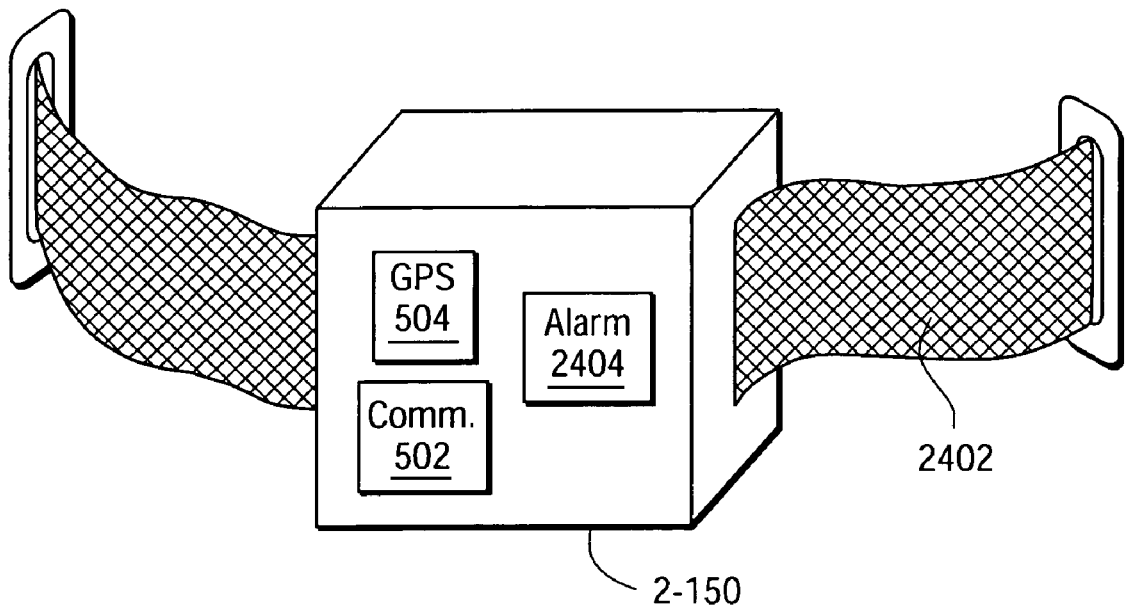
FIG. 24 is a diagram illustrating an embodiment of the present invention.

One embodiment of a remote unit in accordance with the present invention is shown with reference to FIG. 24. In the embodiment illustrated, the remote unit 2-150 may be removeably affixed to an object or person or pet, such as via a lock, etc. As shown, the remote unit 2-150 includes GPS receiver 504 and controller 502. In the embodiment illustrated, the remote unit 2-150 may be affixed to a person or pet via belt 2402 to provide a monitor with presence and location information related to the monitored user. In addition, in certain embodiments, an audible alarm 2404 may be provided.

Figure 25:
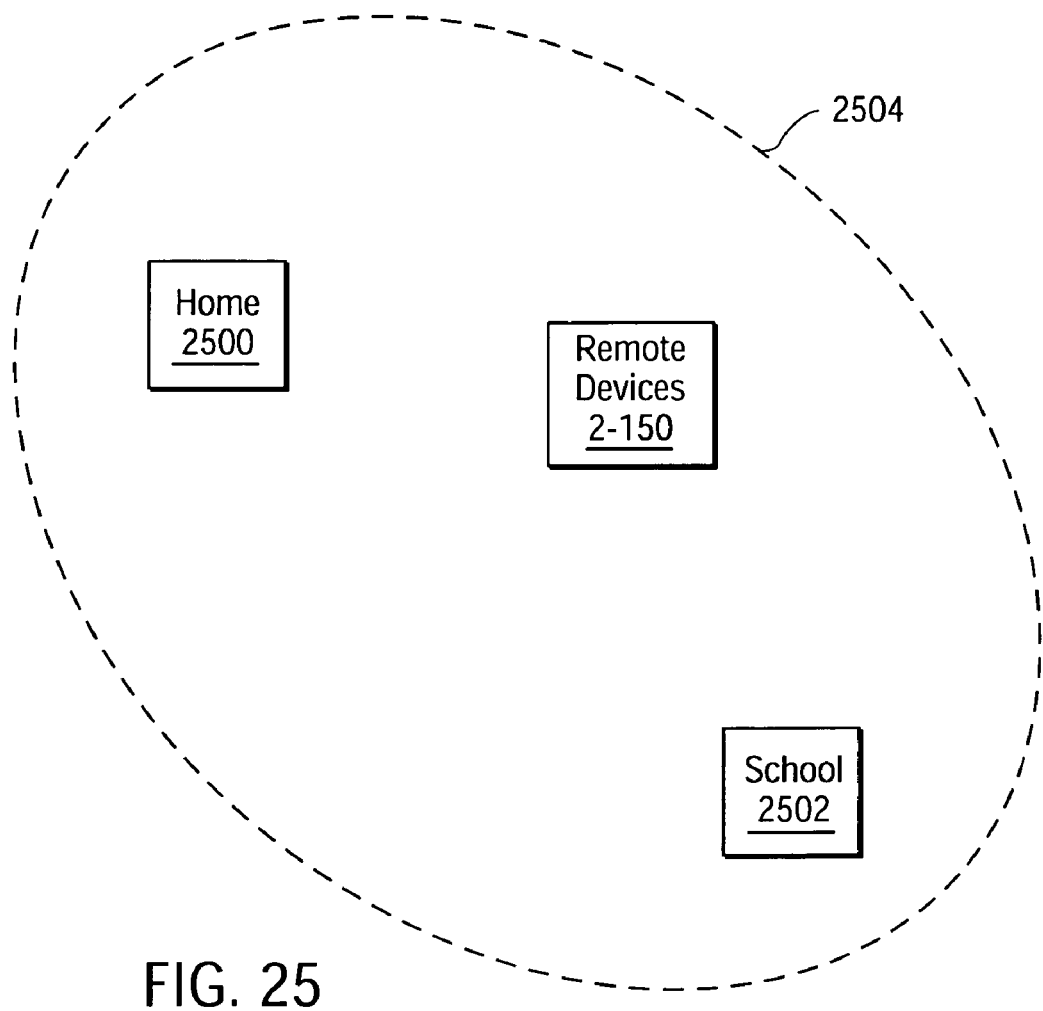
FIG. 25 is a diagram illustrating operation of an embodiment of the present invention.

Operation of this embodiment of the present invention is shown with reference to FIG. 25. Shown is remote unit 2-150 and exemplary sites Home 2500 and School 2502. A boundary or perimeter 2504 is defined by a base or home user, as will be explained in greater detail below, and is uploaded to the remote device 2-150. The remote unit 2-150 is tracked within the area defined by boundary 2504, in a manner similar to that discussed above; presence information, such as contact information (e.g., a school telephone number), may be provided. If the device exits the region or crosses the boundary, an alarm will be sent to an administration device such as a base or home user. As will be explained in greater detail below, the user may also define day of week and time of time associations with the boundary 2504.

Figure 26:
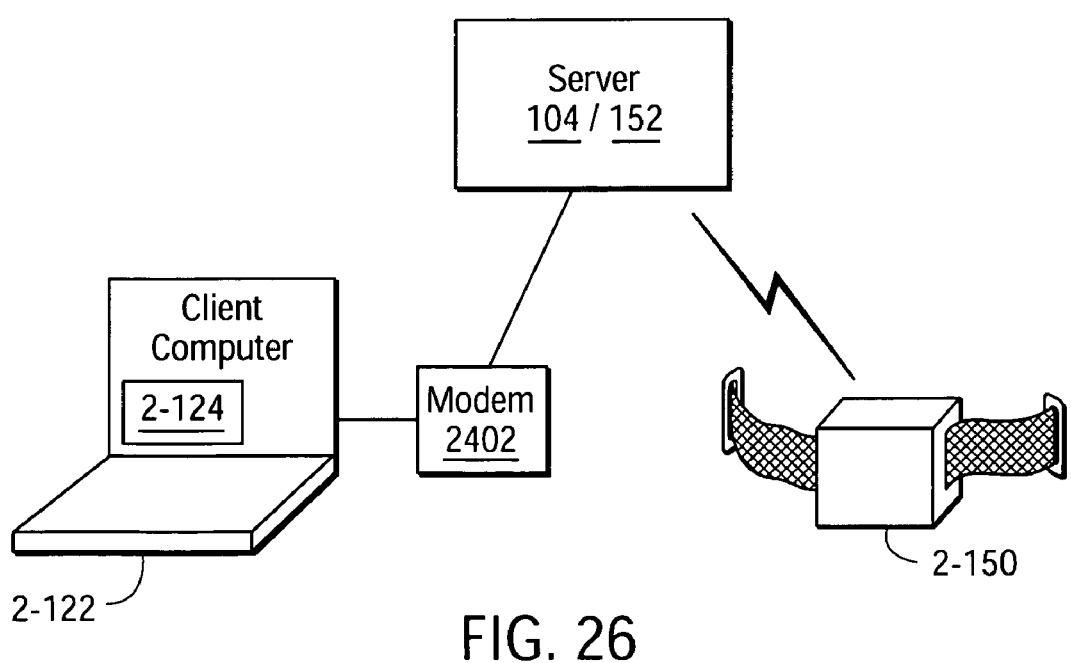
FIG. 26 is a diagram illustrating an embodiment of the present invention.

A system for programming the remote unit 2-150 is shown in FIG. 26. In general, the system of FIG. 26 is similar to that of FIG. 1, but may be more suitable for a home user. As shown, the system includes an administration device such as a server 104/152 (for convenience, functions of the servers 104, 152 are shown in a single unit), as well as a client computer 2-122, with software 2-124 to program location and time ranges, as well as presence and contact information. The computer 2-122 may be equipped with a modem or other network interface device 2602 for communicating with the server 104/152. As shown, the modem 2602 may be implemented as a landline modem or a wireless modem.

In operation, the client computer 2-122 programs location and/or time-date boundaries, which are uploaded to the server 104/152 via modem 2602. The server 104/152 then "calls" the cellular phone number of the remote unit 2-150 and uploads the location parameters and can associate presence information, as well. In turn, the remote unit 2-150 periodically receives GPS signals and transmits the associated coordinates to the server 104/152, which can then send these to the client 2-122. Alternatively, the remote unit 2-150 itself can perform the location compares and transmit to the client 2-122 when it detects it is outside the defined boundaries.

It is noted that, in alternate embodiments, the client computer 2-122 could perform all server-related functions. Further, it is noted that the location alarm could be sent to any desired location, i.e., a user cellular telephone not directly associated with the client computer 2-122. Thus, the figures are exemplary only.

Figure 27:
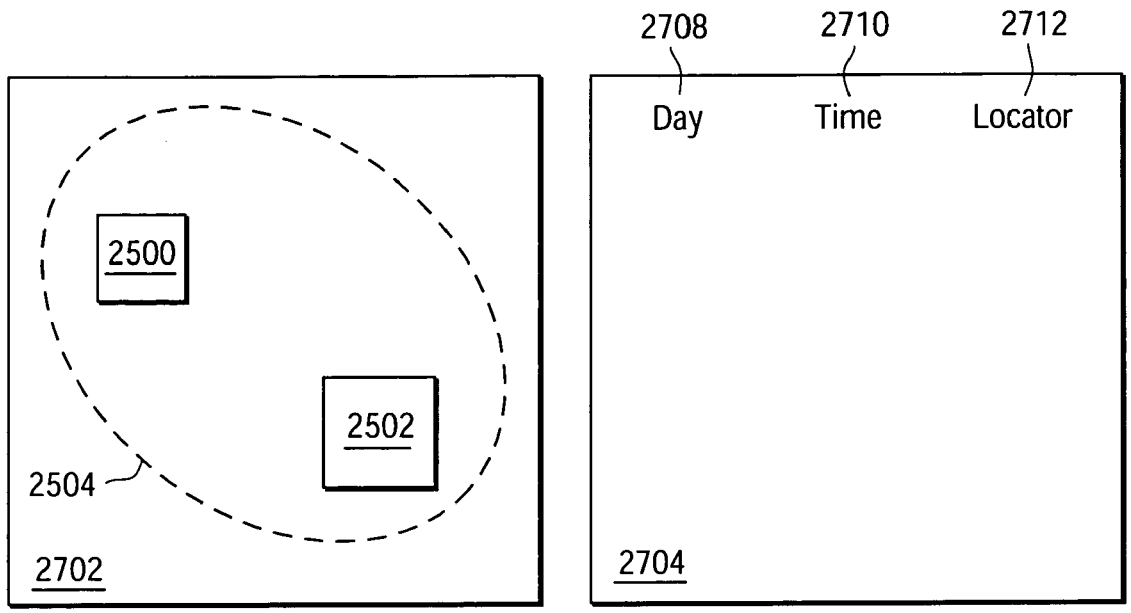
FIG. 27 is a diagram illustrating a graphical user interface according to an embodiment of the present invention.

FIG. 27 illustrates an exemplary graphical user interface for setting location and time parameters. For example, 2702 illustrates a mapping window for defining the boundary 2504 and one or more place locations 2500, 2502. In operation, a user could draw the boundary on the desired map, and define individual addresses 2500, 2502 for special treatment. For example, a second window 2704 for entering day 2708, time 2710, and location (e.g., address) 2712 parameters is also shown.

Figure 28:
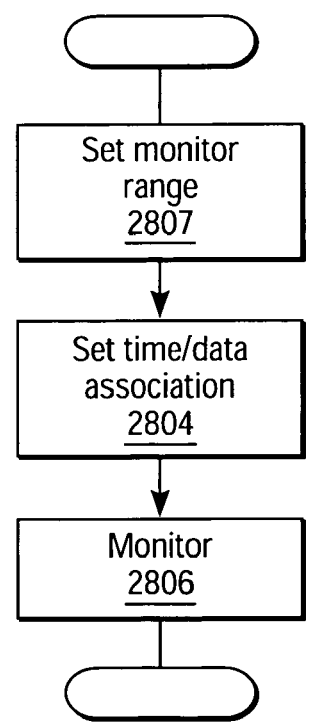
FIG. 28 is a flowchart illustrating operation of an embodiment of the present invention.

Turning now to FIG. 28, a flowchart illustrating operation of an embodiment of the present invention is shown. In a step 2802, the user can program in the location parameters. At step 2804, the user can program in associated date and time parameters. The received parameters can be maintained in a database in association with a device identification at the client computer, the server, or the remote unit itself, in a manner similar to that discussed above. The parameters may be sent to the remote unit 2-150 via the modem by dialing an associated cell phone number. In step 2806, the system then monitors the location.

Figure 29:
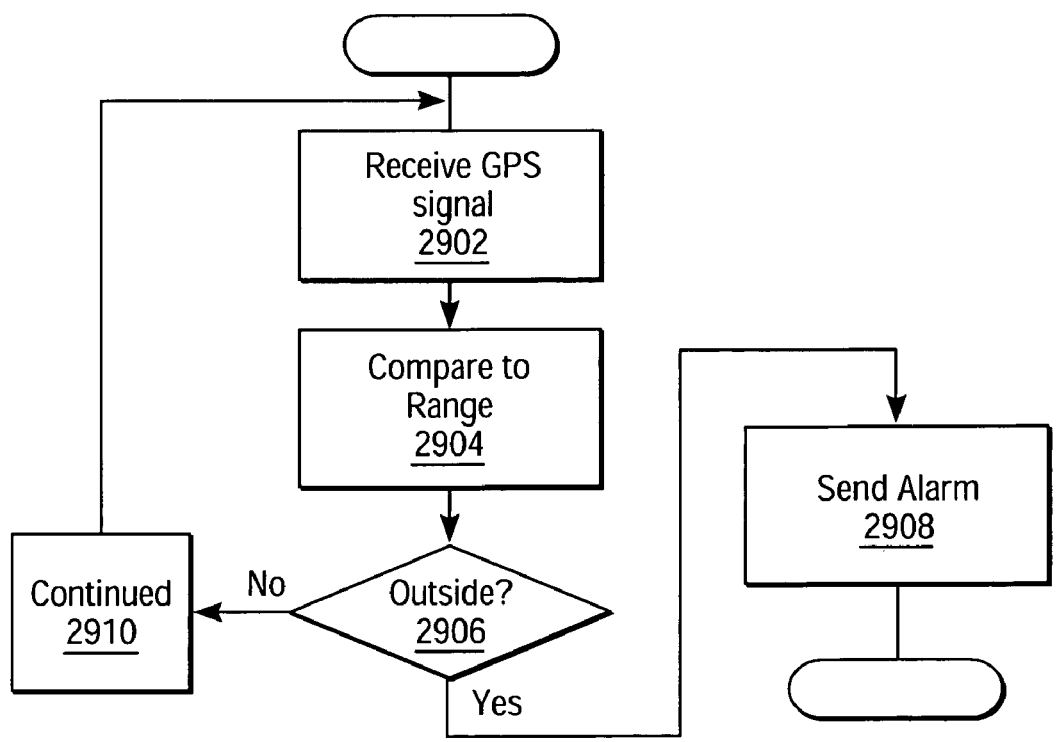
FIG. 29 is a flowchart illustrating operation of an embodiment of the present invention.

Turning now to FIG. 29, a flowchart illustrating operation of an embodiment of the present invention is shown. At step 2902, the remote unit 2-150 receives position signals, such as GPS signals. At step 2904, the received position signal is compared with the database. As noted above, this may be done either at the remote unit itself, by the server, or by the client computer. If the remote unit 2-150 is determined to be outside the range, as determined at step 2906, then in step 2908, an alarm is signaled. Otherwise, at step 2910, the system continues to monitor the location.

Secure Monitoring

In addition, a tracking system such as described above may be equipped to allow a monitored person to request a boundary or schedule change. Such a system may be used, for example, by a parolee and parole officer. Again, rules, presence, location and alarm updates may be transmitted in a manner similar to that discussed above.

Figure 30:
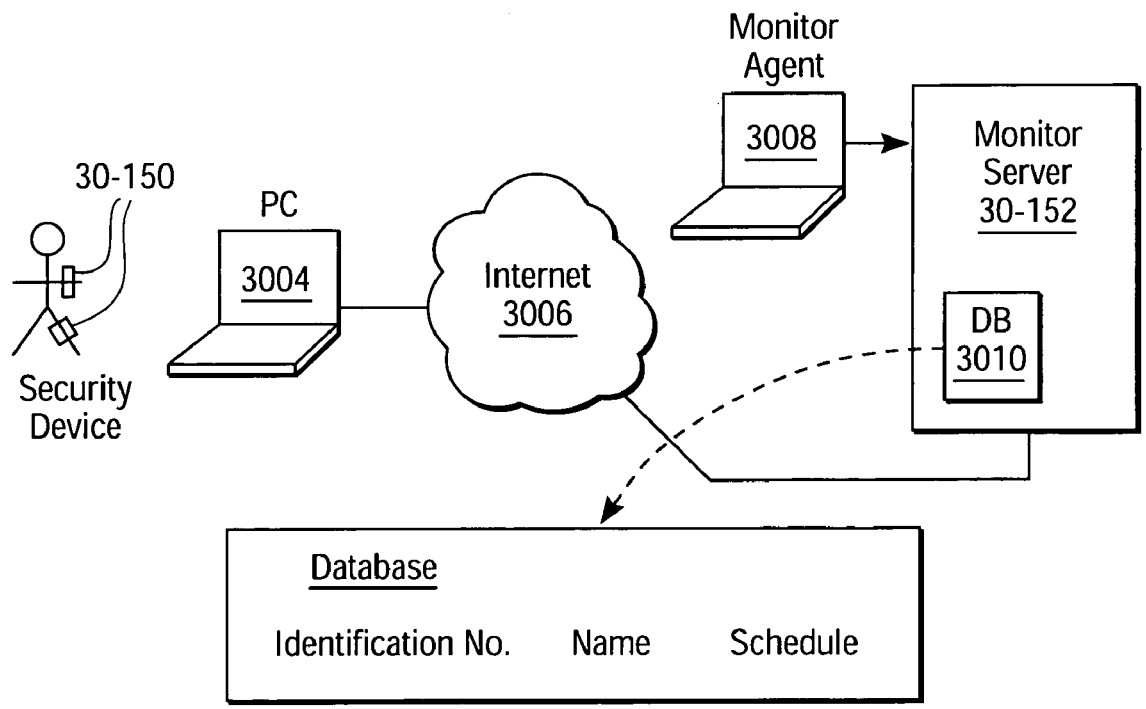
FIG. 30 is a diagram illustrating an embodiment of the present invention.

Such a system 3000 is shown in FIG. 30. In the embodiment illustrated, the system 3000 includes a remote security device 30-150 and server 30-152. The remote security device 30-150 and server 30-152 may communicate, as in the above embodiments, via the Internet or cellular or PCS networks. In addition, the system includes a user computer, such as a personal computer 3004, which couples via the Internet to a monitor agent 3008, who is also capable of communicating with the monitor server 30-152. The monitoring server includes database 3010, which is accessible from monitor agent, typically a secure connection.

In operation, the security device 30-150 is programmed with a predetermined user schedule and location boundaries. The security device 30-150 will send an alarm to the monitoring agent 3008 if the user violates those boundaries or deviates from the schedule. In certain embodiments, the alarm may additionally be an audio alarm. Such an alarm could sound when the user exits the permitted area, and increase in volume over a predetermined period or range of the boundary until it achieves a maximum, as will be explained in greater detail below.

In addition, as will be explained in greater detail below, the user may request a temporary deviation from the schedule. For example, if the user must travel to a location not on the schedule or within the boundaries, he can use computer 3004 to request a temporary change in the boundary. The request is transmitted to the monitoring agent 3008, who can deny or grant the request. If the request is granted, the database 3010 is updated.

Figure 31:
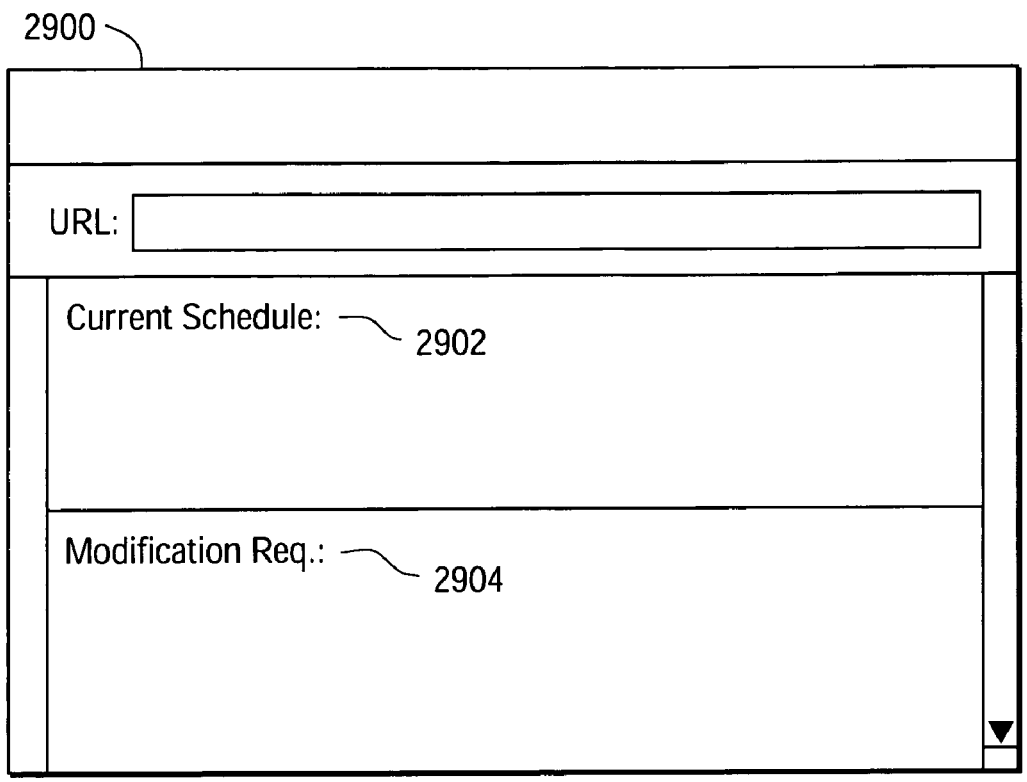
FIG. 31 is a diagram illustrating an embodiment of the present invention.

The actual monitoring of the device 30-150 and communicating updates may be accomplished in a manner similar to that discussed above. The exception request, however, may be made using e-mail and/or a secure Internet host web site Internet such that the user can log in to the host and transmit the request. For example, FIG. 31 illustrates an exemplary secure web page request window 3100. As shown, the window includes a current schedule 3102 and a modification request 3104. It is noted that such a modification request web page may have different formats and employ suitable scripting to ensure security. The figure is exemplary only. Alternatively, the user can compose a suitable e-mail or text message including the necessary identification and re-scheduling information.

In either case, the request is received at the monitoring agent 3108, such as a parole officer. The monitoring agent 3108 can himself log in to the supervising server 31-152 to accept or reject the request. If the request is accepted, the monitoring agent 3108 can update the database and transmit the update to the remote unit. For example, the update may be transmitted to the remote unit 31-150 using the cellular telephone network in a manner similar to that described above.

Figure 32:
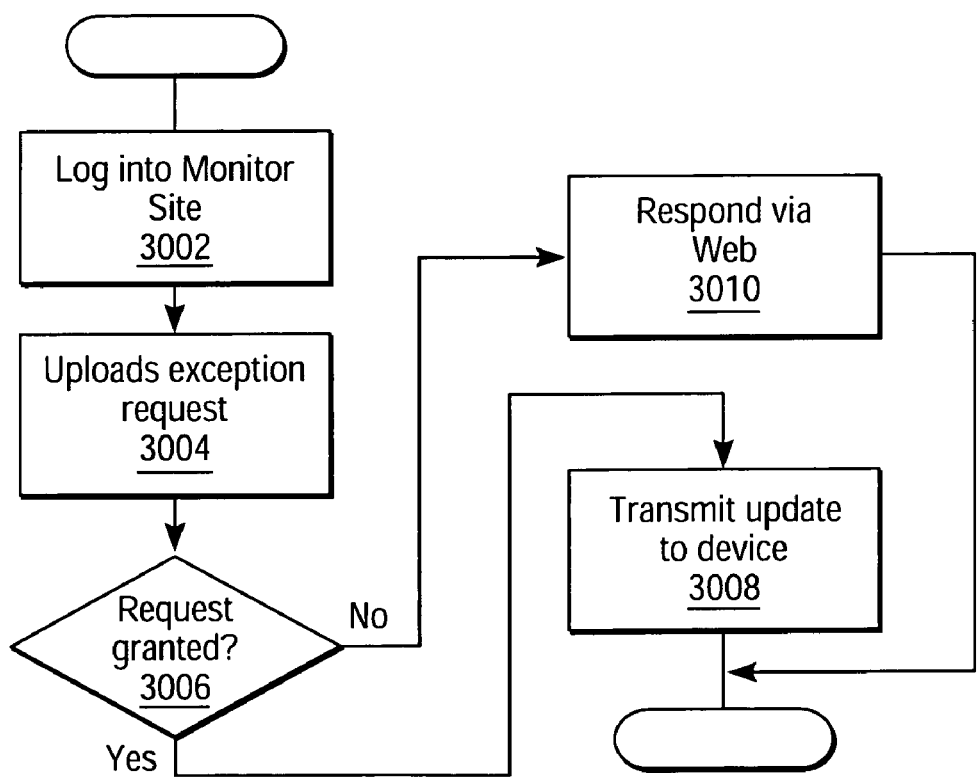
FIG. 32 is a flowchart illustrating operation of an embodiment of the present invention.

Turning now to FIG. 32, a flowchart illustrating operation of an embodiment of the present invention is shown. In a step 3202, the monitored user can access a monitor web site, or otherwise compose a modification request. In a step 3204, the request can be delivered to the monitoring agent. If the request is granted, in a step 3206, then the update to the boundaries/schedule is transmitted to the security device 31-150. Otherwise, the monitoring agent can respond, in a step 3210, via the web or an e-mail or other communication method.

Intermediate and Audio Alarm

Figure 33:
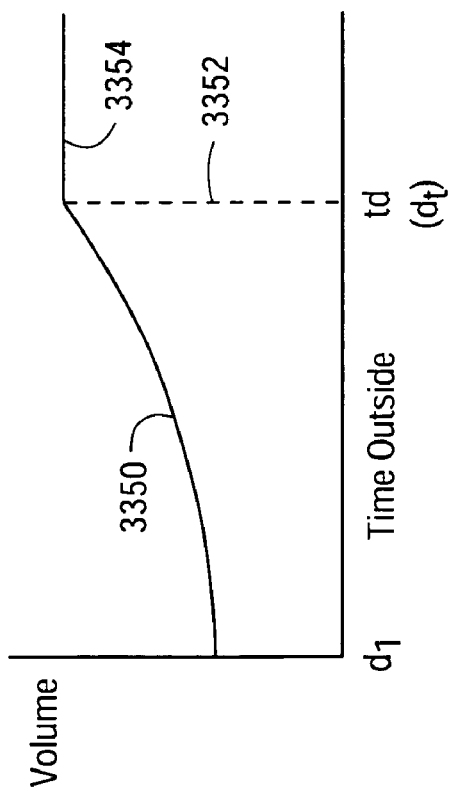
FIG. 33 is a diagram illustrating operation of an embodiment of the present invention.

As noted above, the remote device can be equipped with an audible alarm as well as the transmission alarm, which can vary depending on the amount of time or the distance the user has violated the boundary condition. As shown in FIG. 33, the volume of the audible alarm 3350 can increase with distance or time, until it a threshold 3352 of distance or time is reached. At this time, the volume can plateau at a maximum level 3354.

Figure 34:
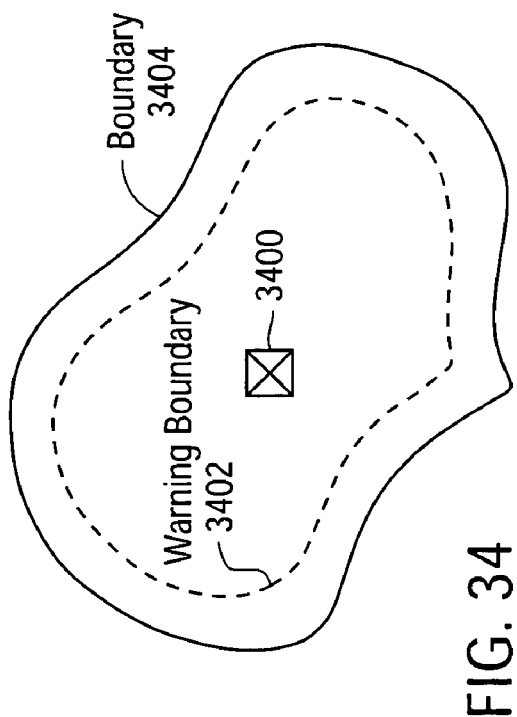
FIG. 34 is a diagram illustrating operation of an embodiment of the present invention.

Shown in FIG. 34 is a map that may correspond to the volume graph of FIG. 33. Shown is a user 3400, a warning boundary 3402, and a boundary 3404. In operation, the system may detect the user crossing the warning boundary 3402, which may correspond to point d1 on the graph of FIG. 33. As the user proceeds to boundary 3404, the volume increases; the boundary 3404 may correspond to the point df on graph of FIG. 33. At this point, the volume is at a maximum. Similarly, as noted above, the volume alarm may be triggered based on time after crossing either warning boundary 3402 or boundary 3404.

Figure 35:
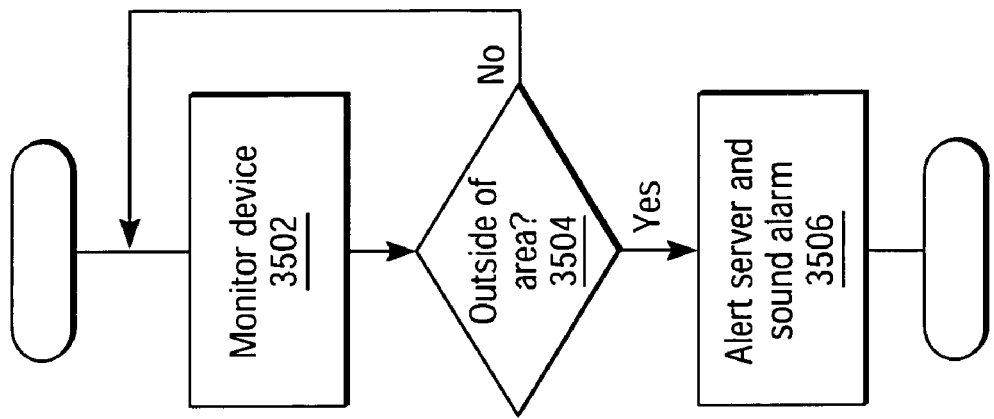
FIG. 35 is a flowchart illustrating operation of an embodiment of the present invention.

Operation of this embodiment is shown with reference to the flowchart of FIG. 35. As shown, in step 3502, the remote security unit 31-150 monitors the user's location. If the user is inside the designated area, as determined in step 3504, the system will continue to monitor. If the user is outside the designated area, then in step 3506, the device 31-150 may sound an audible alarm or send an alert to the monitoring station 31-152. As noted above, in certain embodiments, the user may be given a predetermined time to return to within the designated boundary prior to sounding the alarm.

Figure 36:
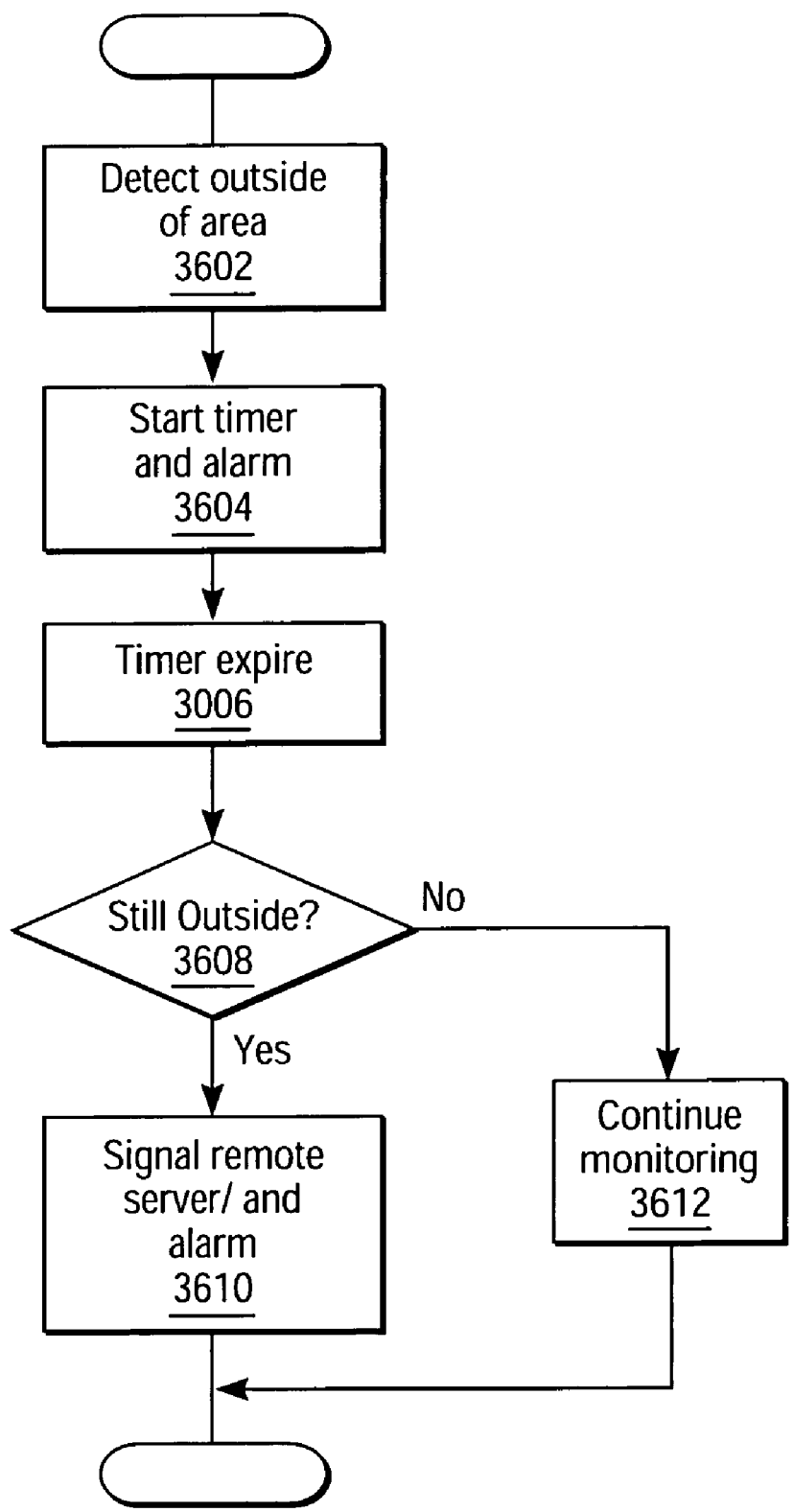
FIG. 36 is a flowchart illustrating operation of an embodiment of the present invention.

A flowchart illustrating operation of another embodiment of the present invention is shown in FIG. 36. In step 3602, the device 31-150 detects it is outside the prescribed area. At 3604, a timer is started. This may be either on-board or associated with the remote server(s). At 3606, the timer may expire. The system checks if the user is still outside the designated area, in step 3608. If not, the system will simply continue monitoring, in step 3612. Otherwise, at step 3610, the system can sound the alarm, either at a maximum level, or a ramp up level.

The invention described in the above detailed description is not intended to be limited to the specific form set forth herein, but is intended to cover such alternatives, modifications and equivalents as can reasonably be included within the spirit and scope of the appended claims. For example, while described primarily with reference to global positioning signals, alternative methods for determining device location may be used. These can include, for instance, use of cell location signals within the cellular network.

What is claimed is:

1. A telecommunications system, comprising:

a plurality of network clients including a positioning controller and a communications controller; and a positioning server including a coordinating controller for maintaining a database of network clients to be tracked and provide updates of position-related information to a presence server;

wherein said plurality of network clients are configured to transmit position information received via said positioning controller to said positioning server via said communications controller, said positioning information including information related to loss of a position signal and wherein a location based on a prior location derived from the position signal is assigned responsive to said loss of a position signal;

wherein contact information associated with the location is updated at the presence server when said position-related information responsive to said loss of position a signal is updated, said contact information being associated with at least one of a plurality of telephone numbers associated with the location.

2. A telecommunications system in accordance with claim 1, wherein said plurality of network clients are configured to associate said loss of said position signal with being inside a building.

3. A telecommunications system in accordance with claim 2, wherein said communications controller is adapted to transmit a position update to said positioning server upon a loss of said position signal.

4. A telecommunications system in accordance with claim 3, wherein said communications controller is adapted to transmit said position update upon said loss of said position signal only if said loss is correlated with a predefined position-presence correlation rule.

5. A telecommunications system in accordance with claim 4, wherein said position signals comprise global positioning system signals.

6. A telecommunications system in accordance with claim 5, wherein said communications controller is a cellular telephone controller.

7. A telecommunications system in accordance with claim 1, wherein said contact information is not updated if the location where a loss of signal occurs is a subset of another location associated with said contact information.

8. A telecommunications device, comprising:
a positioning controller adapted to determine positioning information for said telecommunications device;
a cellular telephone controller adapted to receive said positioning information from said positioning controller and cause said positioning information to be transmitted to an associated server; and
a database controller for maintaining a database of position-presence correlation rules defining when said positioning information is to be transmitted;
wherein said position-presence correlation rules include loss of a GPS signal and a rule to define a location based on previous position signals if said OPS signal is lost and contact information associated with the position that is updated when said positioning information is updated responsive to said loss of said GPS signal, said contact information being associated with at least one of a plurality of telephone numbers associated with the position.

9. A telecommunications device as recited in claim 8, wherein said positioning controller receives Global Positioning System (GPS) signals to determine said positioning information.

10. A telecommunications device as recited in claim 8, wherein said loss of said GPS signal is defined to indicate being inside a building.

11. A telecommunications device as recited in claim 8, wherein said cellular telephone controller transmits changes to location status to said associated server.

12. A telecommunications device as recited in claim 11, wherein said cellular telephone controller is adapted to transmit a position update to said associated server upon a loss of said position signal.

13. A telecommunications device in accordance with claim 12, wherein said cellular telephone controller is adapted to transmit said position update upon said loss of said position signal only if said loss is correlated with a predefined position-presence correlation rule.

14. A telecommunications device in accordance with claim 8, wherein said contact information is not updated if the location where a loss of signal occurs is a subset of another location associated with said contact information.

15. A telecommunications method, comprising:
receiving one or more user positioning and presence correlation rules at a server, wherein positioning information is received from remote users having positioning controllers for receiving location information and communication controllers for transmitting said location information to said server via a wireless communication network; and
transmitting said one or more positioning and presence correlation rules to at least one of said remote users;
wherein said one or more positioning and presence correlation rules include loss of a positioning signal and a rule to define a location based on previous position signals if said positioning signal is lost and contact information associated with the position that is updated when said positioning information is updated responsive to said loss of said positioning signal, said contact information being associated with at least one of a plurality of telephone numbers associated with the location.

16. A telecommunications method in accordance with claim 15, further comprising:
receiving positioning updates at said remote user; and
transmitting presence updates to said server as specified in said one or more positioning and presence correlation rules.

17. A telecommunications method in accordance with claim 16, wherein said loss of positioning signal is defined as being inside a building.

18. A telecommunications method in accordance with claim 15, wherein said communication controller is adapted to transmit a position update to said associated server upon a loss of said position signal.

19. A telecommunications method in accordance with claim 18, wherein said communication controller is adapted to transmit said position update upon said loss of said position signal only if said loss is correlated with a predefined positioning and presence correlation rule.

20. A telecommunications method in accordance with claim 19, wherein said loss of signal is associated with a hysteresis threshold.

21. A telecommunications method in accordance with claim 15, wherein said contact information is not updated if the location where a loss of signal occurs is a subset of another location associated with said contact information.

* * * * *